United States Patent
Zelinski et al.

(10) Patent No.: US 9,395,467 B2
(45) Date of Patent: Jul. 19, 2016

(54) SOLID SOLUTION-BASED NANOCOMPOSITE OPTICAL CERAMIC MATERIALS

(71) Applicant: Raytheon Company, Waltham, MA (US)

(72) Inventors: Brian J. Zelinski, Tucson, AZ (US); Richard Gentilman, Acton, MA (US); Christopher Scott Nordahl, Littleton, MA (US); Thomas M. Hartnett, Nashua, NH (US)

(73) Assignee: Raytheon Company, Waltham, MA (US)

( * ) Notice: Subject to any disclaimer, the term of this patent is extended or adjusted under 35 U.S.C. 154(b) by 286 days.

(21) Appl. No.: 14/032,958

(22) Filed: Sep. 20, 2013

(65) Prior Publication Data

US 2014/0231727 A1  Aug. 21, 2014

Related U.S. Application Data

(63) Continuation of application No. 13/009,837, filed on Jan. 19, 2011, now abandoned, which is a continuation-in-part of application No. 12/821,876, filed on Jun. 23, 2010, now Pat. No. 8,445,822.

(51) Int. Cl.
*F21V 9/00* (2015.01)
*G02B 5/02* (2006.01)
(Continued)

(52) U.S. Cl.
CPC ............ *G02B 1/002* (2013.01); *B82Y 20/00* (2013.01); *B82Y 30/00* (2013.01); *C04B 35/01* (2013.01);
(Continued)

(58) Field of Classification Search
USPC ........ 244/3.1, 3.15, 3.16, 3.19; 252/587, 582; 343/872; 501/1, 87, 152, 153; 977/831, 977/834
See application file for complete search history.

(56) References Cited

U.S. PATENT DOCUMENTS 3,898,051 A  8/1975 Schmid
4,082,427 A  4/1978 Nakashima
(Continued)

FOREIGN PATENT DOCUMENTS

EP   2112127 A1   10/2009
WO   WO 2012/099634 A1   7/2012

OTHER PUBLICATIONS

"U.S. Appl. No. 12/821,876, Amendment and Response filed Sep. 18, 2012 to Non-Final Office Action mailed Sep. 11, 2012", 7 pgs.
(Continued)

*Primary Examiner* — Bijan Ahvazi
(74) *Attorney, Agent, or Firm* — Schwegman Lundberg & Woessner, P.A.

(57) ABSTRACT

A solid solution-based optical material capable of transmitting infrared light, the solid solution-based optical material comprising at least two nano-sized phases intermixed in one another, wherein at least one of the at least two nano-sized phases is a solid solution containing a dissolved dopant, the dissolved dopant present in an amount sufficient to reduce a refractive index difference between the at least two nano-sized phases to about 0.2 or less when infrared light is being transmitted. Various embodiments are directed to related systems and methods. In one embodiment, the infrared light is visible infrared light, short-wave infrared light, eye safe infrared light, medium wave infrared light, long wave infrared red light, or combinations thereof.

11 Claims, 16 Drawing Sheets

(51) Int. Cl.

| | | |
|---|---|---|
| *G02C 7/10* | (2006.01) | |
| *G02F 1/361* | (2006.01) | |
| *G03B 11/00* | (2006.01) | |
| *G02B 1/00* | (2006.01) | |
| *B82Y 20/00* | (2011.01) | |
| *B82Y 30/00* | (2011.01) | |
| *C04B 35/01* | (2006.01) | |
| *C04B 35/053* | (2006.01) | |
| *C04B 35/505* | (2006.01) | |
| *C04B 35/645* | (2006.01) | |
| *F42B 10/46* | (2006.01) | |
| *F42B 15/34* | (2006.01) | |
| *C04B 35/00* | (2006.01) | |
| *F42B 15/01* | (2006.01) | |
| *G06F 19/00* | (2011.01) | |

(52) U.S. Cl.
CPC ............. *C04B 35/053* (2013.01); *C04B 35/505* (2013.01); *C04B 35/6455* (2013.01); *F42B 10/46* (2013.01); *F42B 15/34* (2013.01); *C04B 2235/3206* (2013.01); *C04B 2235/3225* (2013.01); *C04B 2235/3279* (2013.01); *C04B 2235/781* (2013.01); *C04B 2235/80* (2013.01); *C04B 2235/9653* (2013.01)

(56) References Cited

U.S. PATENT DOCUMENTS

| | | |
|---|---|---|
| 4,291,848 A | 9/1981 | Clark |
| 4,304,603 A | 12/1981 | Grossman et al. |
| 4,575,493 A | 3/1986 | Rauch, Sr. |
| 4,654,315 A | 3/1987 | Hsieh |
| 4,930,731 A | 6/1990 | Roy et al. |
| 5,124,285 A | 6/1992 | Dislich |
| 5,358,912 A | 10/1994 | Freitag et al. |
| 5,573,986 A | 11/1996 | Taimy et al. |
| 5,677,252 A | 10/1997 | Gilde et al. |
| 5,702,654 A | 12/1997 | Chen et al. |
| 5,775,643 A | 7/1998 | McMaster et al. |
| 6,341,747 B1 | 1/2002 | Schmidt et al. |
| 6,876,796 B2 | 4/2005 | Garito et al. |
| 6,967,179 B2 | 11/2005 | Miele et al. |
| 7,335,865 B2 | 2/2008 | Tibi |
| 7,688,278 B2 | 3/2010 | Frenkel |
| 8,236,200 B2 | 8/2012 | Sweeney et al. |
| 8,445,822 B2 | 5/2013 | Sunne |
| 2001/0019651 A1 | 9/2001 | Kato |
| 2005/0106384 A1 | 5/2005 | Sambasivan et al. |
| 2009/0167628 A1 | 7/2009 | Frenkel |
| 2009/0283720 A1 | 11/2009 | Sweeney et al. |
| 2010/0105539 A1 | 4/2010 | Hollingsworth et al. |
| 2010/0237344 A1 | 9/2010 | Schoenfeld |
| 2010/0291374 A1 | 11/2010 | Akarsu et al. |
| 2011/0315808 A1 | 12/2011 | Zelinski et al. |

OTHER PUBLICATIONS

"U.S. Appl. No. 12/821,876, Amendment and Response filed Nov. 21, 2012 to Ex Parte Quayle Action mailed Nov. 20, 2012", 7 pgs.
"U.S. Appl. No. 12/821,876, Ex Parte Quayle Action mailed Nov. 20, 2012", 6 pgs.
"U.S. Appl. No. 12/821,876, Interview Summary mailed Sep. 24, 2012", 4 pgs.
"U.S. Appl. No. 12/821,876, Non-Final Office Action mailed Sep. 11, 2012", 7 pgs.
"U.S. Appl. No. 12/821,876, Notice of Allowance mailed Jan. 30, 2013", 8 pgs.
"U.S. Appl. No. 12/821,876, Response filed Apr. 18, 2013 to Notice of Allowability mailed Jan. 30, 2013", 2 pgs.
"U.S. Appl. No. 13/009,837, Response filed May 17, 2013 to Non Final Office Action mailed Mar. 13, 2013", 15 pgs.
"U.S. Appl. No. 13/009,837, Response filed Aug. 15, 2013 to Final Office Action mailed Jun. 27, 2013", 5 pgs.
"U.S. Appl. No. 13/009,837, Final Office Action mailed Jun. 27, 2013", 10 pgs.
"U.S. Appl. No. 13/009,837, Non Final Office Action mailed Mar. 13, 2013", 9 pgs.
"U.S. Appl. No. 13/009,837, Notice of Allowance mailed Aug. 21, 2013", 9 pgs.
"U.S. Appl. No. 13/009,837, Response filed Jan. 16, 2013 to Restriction Requirement mailed Dec. 28, 2012", 6 pgs.
"U.S. Appl. No. 13/009,837, Restriction Requirement mailed Dec. 28, 2012", 7 pgs.
"International Application Serial No. PCT/US2011/057242, International Preliminary Report on Patentability mailed Jul. 23, 2013", 9 pgs.
"International Application Serial No. PCT/US2011/057242, International Search Report mailed Feb. 8, 2012", 2 pgs.
"International Application Serial No. PCT/US2011/057242, International Written Opinion mailed Feb. 8, 2012", 8 pgs.
Choi, Jae Shi, et al., "Electrical Conductivity of Nickel Oxide-Magnesium Oxide Single Crystals", *The Journal of Physical Chemistry*, 77(20), (1973), 2430-2433.
Parish, Mark V, "Polycrystalline Alumina for Advanced Infrared Windows and Domes", [online]. NAVAIR Public Release 09-1234, Cerallova Corporation [retrieved on Jan. 22, 2011]. Retrieved from the Internet: <URL: http://www.virtualacquisitionshowcase.com/document/1157/briefing>, (2011), 6 pgs.
Stefanik, Todd, et al., "Nanocomposite Optical Ceramics for Infrared Windows and Domes", *Proc. of SPIE, vol. 6545, Window and Dome Technologies and Materials* X, (2007), 65450A-1-65450A-5.

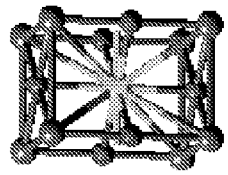
NiMg$_{15}$O$_{16}$ (Im-3m)
FIG. 15B
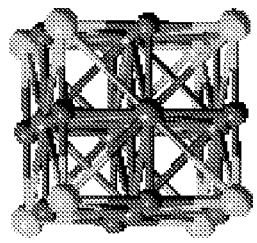
NiMgO$_2$ (P4/mmm)
FIG. 15E
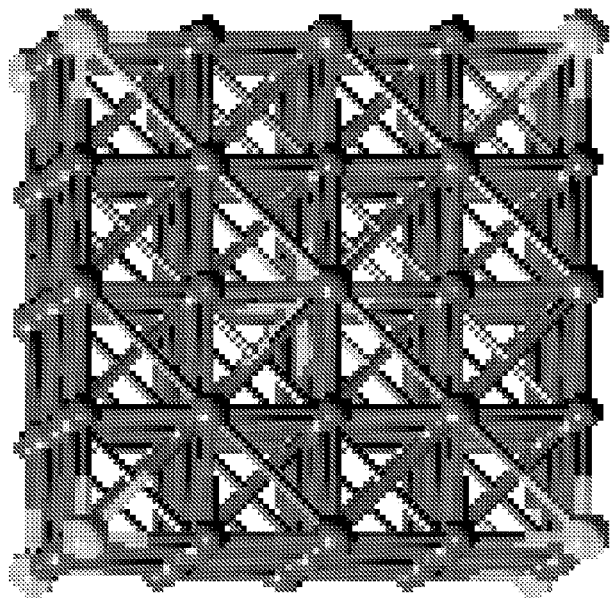
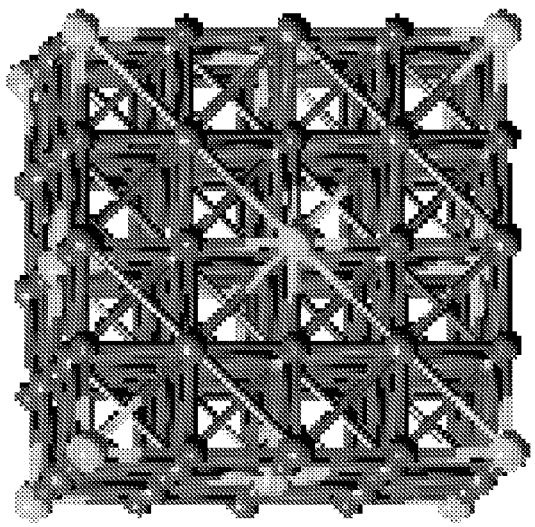
NiMg$_3$O$_4$ (Pm-3m)
FIG. 15D
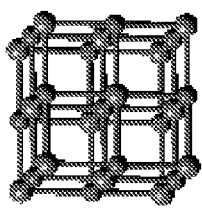
MgO (Fm-3m)
FIG. 15A
NiMg$_7$O$_8$ (Fm-3m)
FIG. 15C

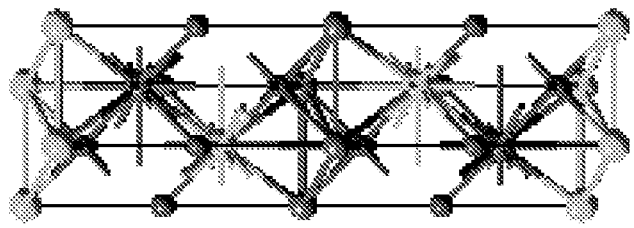
FIG. 15I NiMgO$_2$ (R-3m)
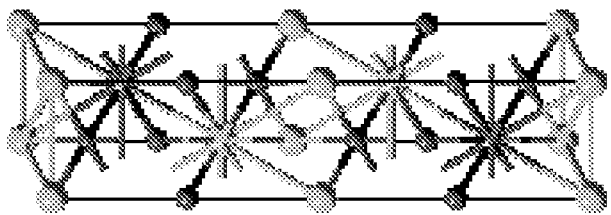
FIG. 15H Ni$_4$Mg$_2$O$_6$ (P-3m1)
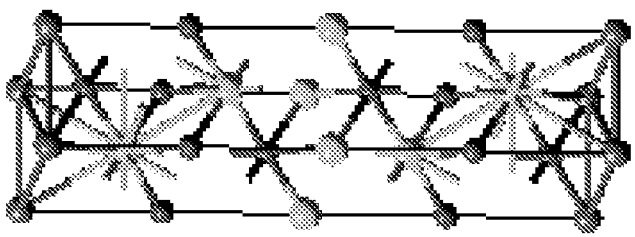
FIG. 15G Ni$_5$MgO$_6$ (P-3m1)
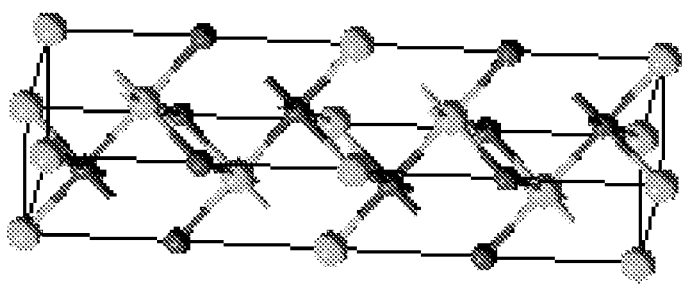
FIG. 15F NiO (R-3m)

A=NiO
B=Ni5Mg06
C=Ni4Mg206
D=NiMgO2
E=Y2O3
F=NiMg304
G=MgO
H=NiMg15O16
I=NiMg708

A=NiO
B=Ni5Mg06
C=Ni4Mg206
D=NiMgO2
E=Y2O3
F=NiMg304
G=MgO
H=NiMg15O16
I=NiMg708

SOLID SOLUTION-BASED NANOCOMPOSITE OPTICAL CERAMIC MATERIALS

RELATED APPLICATIONS

This application is a continuation of, and the claims the benefit of priority to U.S. application Ser. No. 13/009,837, filed on Jan. 19, 2011, which is a continuation-in-part of U.S. application Ser. No. 12/821,876 filed on Jun. 23, 2010, the benefit of priority of each of which is claimed hereby, and each of which are hereby incorporated by reference in its entirety.

BACKGROUND

Airborne platforms carrying electro-optical (EO) sensors for such tasks as target acquisition, identification, guidance, and the like, are generally provided with a transparent dome to protect the optical system. In particular, projectiles, such as missiles, interceptors, guided projectiles, bombs, rockets, shells and sub-munitions, typically have the dome in the front end. Behind this dome, and within the body of the projectile, an EO seeker is provided for capturing electro-magnetic radiation (EMR) from the target, and conveying target information (e.g. bearing or images) to a guidance system, which, in turn, guides the projectile to an object or point within the captured images. Aircraft such as planes or helicopters may be provided with a directed infrared countermeasures (DIRCM) system to jam a missile seeker. This system may be mounted on the belly, tail section or elsewhere on the aircraft behind a protective dome. The dome is generally made of a transparent material that can sustain the aerodynamic and thermal stresses it may experience during missile or aircraft flight. In many conventional applications the dome is made of sapphire.

The size of the field of regard (FOR) obtainable by the EO seeker depends on the spanning angle of the dome used. The term "spanning angle" when used herein refers to the actual angular portion that the dome spans without vignetting with respect to a full sphere whose spanning angle is 360°. The angle measured from the longitudinal axis through the center of the dome to the edge of the FOR is one-half the spanning angle and is referred to as the "look angle." Conventional missile domes, such as sapphire domes, are made of, at most, approximately half a sphere size. Therefore, when a conventional optical seeker is provided at the center of dome, and if mounted on one, two, or more axes gimbals, this optical sensing unit of the prior art can theoretically view a field of regard of, at most, 180 degrees.

Attempts to produce domes in which the FOR is greater than 180 degrees include techniques which separately fabricate two pieces comprising a spherical portion similar to a conventional dome and an extended portion, which are then joined to form the dome. However, the attachment process creates an optical interface along the line of attachment, which produces a discontinuity as the EO seeker scans the FOR. Such a discontinuity poses a risk the seeker may lose track on the target.

SUMMARY

The inventor is the first to recognize the need for improved nanocomposite optical ceramic materials which can provide transparency in the visible and SWIR spectrums while maintaining robust mechanical and thermal properties. Accordingly, in one embodiment, a nano-structure comprising a solid solution-based optical material capable of transmitting infrared light, the solid solution-based optical material comprising at least two nano-sized phases intermixed in one another, wherein at least one of the at least two nano-sized phases is a solid solution containing a dissolved dopant, the dissolved dopant present in an amount sufficient to reduce a refractive index difference between the at least two nano-sized phases to about 0.2 or less when infrared light is being transmitted is provided.

In one embodiment, a system comprising an airborne platform; and an electro-optic sensor system located on the airborne platform, wherein the electro-optic sensor system includes the aforementioned nano-structure is provided.

In one embodiment, a method of reducing a refractive index mismatch comprising intermixing a first nano-sized phase and a second nano-sized phase into one another, wherein the first nano-sized phase has a first refractive index and the second nano-sized phase has a second refractive index; and adding a dopant to the first phase to increase or decrease the first refractive index to substantially match the second refractive index is provided.

The novel solid solution-based nanocomposite optical ceramic materials described herein may be useful in a variety of applications, other than military, such as civilian or medical applications. Other features and advantages will become apparent from the following description of the embodiments, which description should be taken in conjunction with the accompanying drawings.

BRIEF DESCRIPTION OF THE DRAWINGS

FIGS. 15A-15I show models of computational cells, together with their particular space group, in accordance with illustrative embodiments of the present invention.

DETAILED DESCRIPTION

Figure 1A:
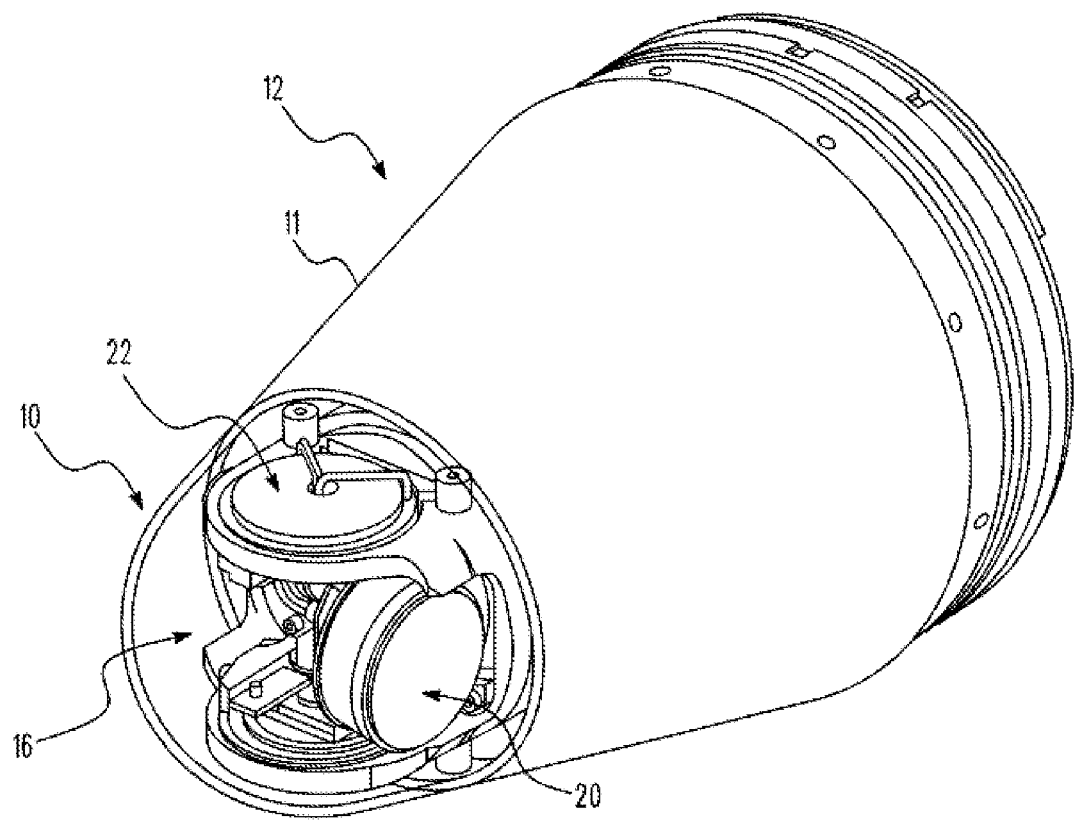
FIGS. 1A and 1B show isometric and section views of the nose of a guided projectile incorporating a one-piece extended dome in accordance with an illustrative embodiment of the present invention.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The infrared (IR) spectrum generally refers to electromagnetic radiation having a wavelength between 0.7 and 300 micrometers. The IR spectrum is typically divided into ranges, which can vary depending on which scheme is used, such as a sensor response division scheme, an astronomy division scheme, a CIE scheme or the ISO 20473 scheme.

As used herein, the term "visible range" refers to radiation having a wavelength range of about 0.4 to about 0.75 microns (μm). The term near infrared (NIR) is generally considered to refer to radiation having a wavelength range of about 0.75 to about 1.4 μm, while the term "short wavelength infrared" (SWIR) is considered to refer to a wavelength range of about 1.4 to about 3 μm. However, as used herein, except where noted, the term "short wavelength infrared" (SWIR) is intended to encompass both near infrared (NIR) and SWIR, and refers to radiation having a wavelength range from about 0.75 to about three (3) μm, with an "eye-safe" wavelength range considered to be from about 1.5 to about 1.8 μm. Mid wavelength infrared (MWIR), also referred to as "intermediate infrared", is generally considered to include radiation between about three (3) and about 8 μm, possibly up to about 8.5 μm. However, in guided missile applications, the about three (3) to about five (5) μm portion of this band is the atmospheric window in which the homing heads of passive IR "heat seeking" missiles are generally designed to work, homing on to the IR signature of a target. That is, this range is generally considered to be the range of wavelengths which can come through the atmosphere. Therefore, although most MWIR applications for the novel materials described herein may fall within the range of about three (3) to about five (5) μm, it is to be understood that embodiments directed to the MWIR spectrum, unless otherwise noted, are not so limited. Long wavelength infrared (LWIR), which is considered the "thermal imaging" region, generally refers to radiation having a wavelength of between about eight (8) (or possibly about 8.5 μm) up to about 15 μm, although most applications likely don't exceed 12 to 14 μm. Forward looking infrared (FLIR) systems use this area of the spectrum, sometimes also referred to as "far infrared" (FIR).

Current nanocomposite materials do not transmit light in the SWIR and visible portions of the spectrum because the difference in refractive indices of the phases comprising the nanocomposite is too large. This difference causes scattering of the light at the shorter wavelengths associated with the visible and SWIR, leading to opacity. In an effort to overcome the limitations of prior technologies, attempts have been made to provide domes comprising a single nanostructure or phase in a continuous "host" macro-matrix background. However, strength-reducing processing flaws are commonly associated with use of larger-grained matrix phases, which can negatively affect a dome's optical properties. Such flaws remain even if the material is reinforced with nano-dispersoids. As such, such materials may not possess adequate strength to bear the aerodynamic forces present during launch and flight of a guided projectile.

Accordingly, various solid solution-based embodiments described herein provide materials which have been adjusted to reduce or substantially eliminate the difference in indices between the phases of the nanocomposite, thus eliminating scatter and extending the rage of transmittance into the SWIR and visible portions of the spectrum. This is accomplished by adjusting one of the phases through formation of a solid solution, such that the refractive index of the adjusted phase equals or nearly equals that of the remaining phase or phases constituting the nanocomposite optical ceramic material. A solid solution phase, as is known in the art, is a single phase region that has at least two different cations mixed together on the same crystal lattice, making it a homogeneous mixture or solution at the atomic level. Therefore, in contrast to mixtures of liquids which form a liquid solution, a solid solution has a crystal lattice (periodic arrangement of atoms).

In one embodiment, the nano-sized optical materials comprise two or more nanostructures (such as, but not limited to nanograins or nanoparticles) which are intermixed in one another to form a nanocomposite, but which maintain their chemical distinctness, i.e., remain in separate phases. Such nanocomposites, by definition, are not embedded in a macro background, thus eliminating the issues inherent when using macro-sized grains, such as strength-reducing processing flaws. Additionally, use of the novel materials described herein in applications such as extended domes, provides a spanning angle greater than 180 degrees from a single integrated material Essentially, the extended dome comprises seamless first and second non-complementary geometric shapes, such as a first spherical geometry and a second conical or ogive geometry.

Nanocomposite materials useful herein are capable of transmitting optical light (i.e., visible light, as compared with light in other spectrums, such as SWIR and MWIR), such as a combination of nano-sized covalent materials (e.g., diamond) together with elements such as germanium or silicon. In one embodiment, the material is a nanocomposite optical ceramic material comprising two chemically distinct nanostructures intermixed in one another sufficiently to allow a single, two-phase material to form which possesses the desired optical properties, as well as the desired strength and thermal properties. In one embodiment, a first nanostructure phase (comprising, e.g., nanograins) is selected such that the second nanostructure phase (comprising, e.g., nanograins) does not chemically combine with, but remains intermixed with first phase. In one embodiment, the two phases are two nanograined phases which are mixed sufficiently to allow formation of material barriers to grain growth between the various nanograins, thus strengthening the nanocomposite optical ceramic material by retaining the nanoscale of the nanostructure. In general, the two phases are intermixed sufficiently to prevent or minimize nanostructure growth to larger sizes due to lack of "pinning" or restraint of the nanostructure boundaries by the second phase. In one embodiment, intermixing of at least five (5) % by volume (v), may be sufficient. In other embodiment, more than about five (5) % (v), such as up about 10% (v), such as up to about 15% (v) or higher, such as at least 20% (v) or higher, such as about to an approximately 50:50 mixture by volume, including all ranges there between.

In one embodiment, the nanocomposite material comprises two nano-sized phases (intermixed as described above), with one of the phases adjusted through formation of a solid solution such that the refractive index of the adjusted phase becomes substantially equal or nearly equal to that of the remaining phase, thus forming a solid solution nanocomposite material. Essentially, in this embodiment, one phase is "doped" by a dopant which not only causes formation of a solid solution, but can further improve the refractive properties of a nanocomposite material, such as a nanocomposite optical ceramic material.

The dopant can comprise atoms mixed on a cation or anion lattice, i.e., on the atomic scale. In one embodiment, the dopant is sub-nanometer in size, having a radius on the order of about less than one (1) nanometer, down to about 0.1 nanometers. In one embodiment, the dopant comprises atoms mixed on a cation lattice with the cation having a radius of between about 0.1 and about 0.2 nanometers. In one embodiment, NiO is used as the dopant. In one embodiment the dopant can also maintain or enhance the thermal and mechanical properties of the material. As such, the novel solid solution-based nanocomposite materials described herein may be useful not only in applications in MWIR and LWIR spectral regions, but also in the SWIR and even visible spectral regions, as well as in multi-mode operations (i.e., more than one spectral region).

Figure 1B:
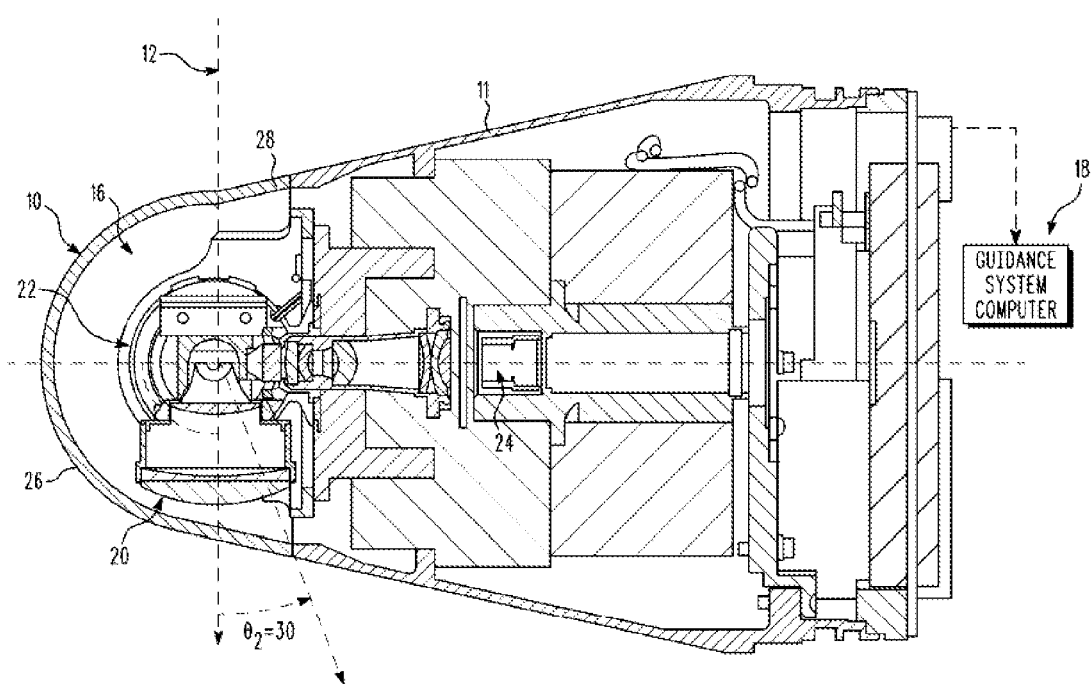

FIGS. 1A and 1B show an embodiment of a one-piece extended dome (hereinafter "dome") 10 mounted on the nose 11 of a guided projectile 12. In this embodiment, the nose 11 is attached to a projectile body (not shown) that typically includes a fuse assembly and warhead and one or more aerodynamic control surfaces. Behind the dome 10, and within the nose 11 of the guided projectile 12, an EO seeker 16 is provided for capturing images and conveying them to a guidance system computer 18 (FIG. 1B), which, in turn, controls aerodynamic control surfaces (e.g. fins, canards, etc.) to guide the guided projectile 12 to an object or point within the captured images. In this embodiment, the EO seeker 16 includes an objective lens 20 mounted on a gimbal mechanism 22 for movement in three degrees of freedom and a detector 24 receiving EMR passing through the objective lens 20 to the detector 24 (FIG. 1B), which, in turn, conveys target information (e.g. bearing or images) to the guidance system computer 18 (FIG. 1B).

In one embodiment, the gimbal mechanism 22 moves the object lens 20 in three degrees of freedom through a spanning angle greater than 180 degrees (look angle $\Theta$ greater than 90 degrees) without vignetting. In another embodiment, additional EO components are positioned behind and adjacent to the extended portion of the dome 10 to receive or transmit EMR through the extended portion of the dome 10. In this latter case, the gimbal mechanism 22 may move the objective lens 20 through a spanning angle that may be less than or greater than 180 degrees, depending on the configuration of the EO seeker 16.

The dome 10 can be integrally-formed of a nanocomposite optical ceramic material or a solid solution-based nanocomposite optical ceramic material. In one embodiment, the dome 10 is substantially transparent over a portion of the IR Band including near IR (about 0.75 to about 1.4 microns), SWIR (about 1.4 to about 3 microns), MWIR (about 3 to about 8.5 microns), LWIR (about 8 to about 12 microns), and/or the visible band (about 0.4 to about 0.75 microns).

In an embodiment using a mixture of yttria (yttrium oxide, $Y_2O_3$) and magnesia (magnesium oxide, MgO), the nanocomposite optical ceramic material comprising the dome 10 transmits from 1.5 to 8.5 microns. The dome 10 comprises seamless first and second non-complementary geometric shapes 26, 28, such as a first spherical geometry 26 and a second conical or ogive geometry 28 (i.e., a geometry comprising a section or a large radius or arc). In this particular embodiment, the spherical geometry 26 supports a look angle $\Theta_1$ of 85° and the conical geometry 28 supports an additional look angle $\Theta_2$ of 30° for a total look angle $\Theta$ of 115°. The spherical geometry 26 is generally bounded to be less than 90°, typically 87° or less and is typically greater than 75°.

Figure 2:
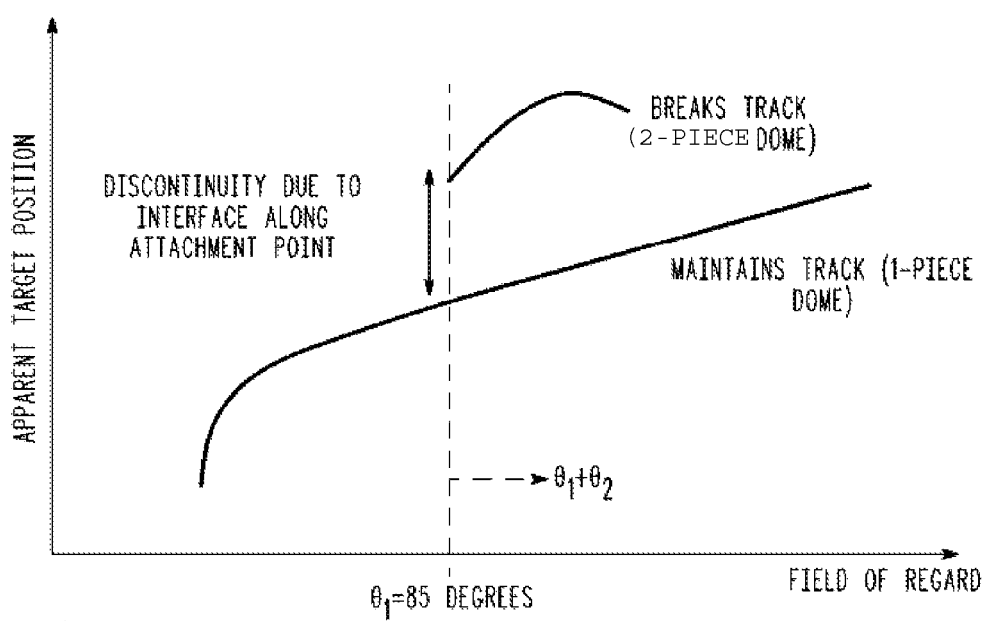
FIG. 2 shows tracking of a target through a dome with an optical interface between the spherical and conical sections as compared to an optical interface between the spherical and conical sections in accordance with an illustrative embodiment of the present invention.

FIG. 2 plots apparent target position 40 versus look angle for a conventional two-piece extended dome and one embodiment of a novel one-piece extended dome. In a typical EO seeker for either a guided projectile or DIRCM system, the seeker moves within the FOR to lock-on and track a target. As the seeker swings through the spherical section of the dome, for either the 2-piece or 1-piece configuration, the seeker maintains track 42 on the target. However, for conventional two-piece domes as the seeker swings across the attachment point it sees a discontinuity due to the optical interface or blockage, which may produce a discontinuity 44 in apparent target position. The guidance system responds to this discontinuity, which may cause the projectile or DIRCM system to break track 46, possibly resulting in mission failure. In contrast, with use of a novel one-piece dome as described herein, as the seeker swings from the spherical geometry to the conical geometry, it sees a seamless transition and maintains target track 48. This seamless transition between the non-complementary spherical and conical (or ogive) geometries enables the use of extended domes for guided projectiles and DIRCM.

Figure 3A:
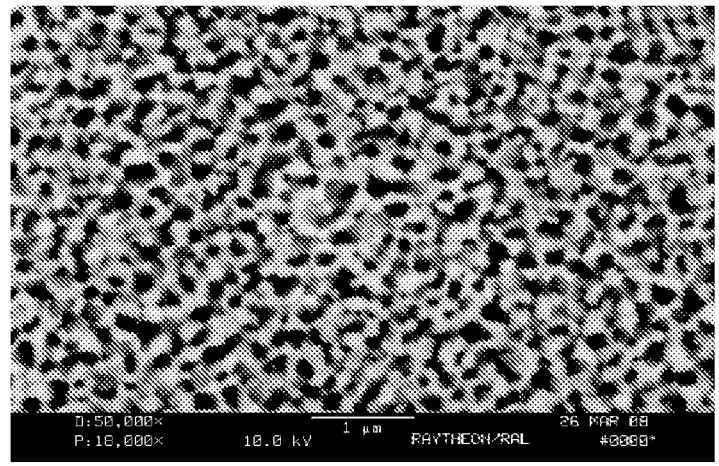
FIGS. 3A and 3B show a nanocomposite optical material at different magnifications comprising two separate phases of nanograins in accordance with an illustrative embodiment of the present invention.
Figure 3B:
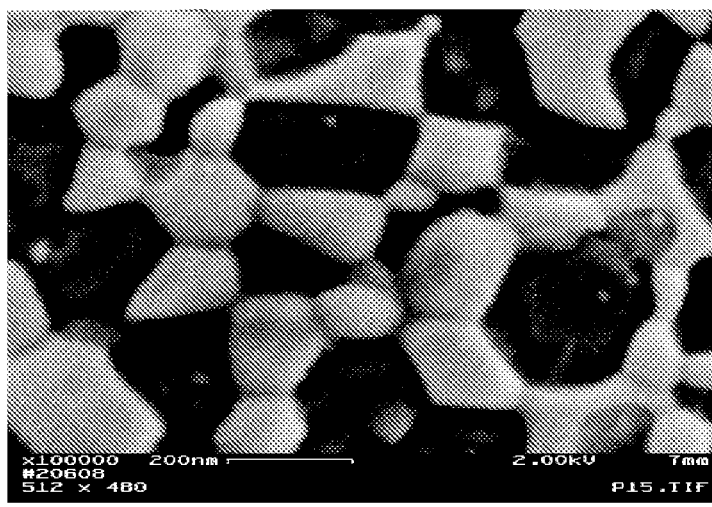

FIGS. 3A and 3B show an embodiment of the nanocomposite optical ceramic powder material 50 comprising two or more different chemical phases of nanograins intermixed in one another, each phase having a substantially uniform submicron grain dimension (≤100 nm) in at least the direction approximately perpendicular to the direction of propagation of the transmitted light. In one embodiment, the submicron grain dimension may include all submicron grain dimensions that are less than approximately $1/10^{th}$ of the wavelength of transmitted light. In one embodiment, the submicron grain dimension may include all submicron grain dimensions that are less than approximately $1/20^{th}$ of the wavelength of transmitted light. Use of two or more phases of nanograins allows formation of material bathers to grain growth between the various nanograins, thus strengthening the nanocomposite optical ceramic material or the solid solution-based nanocomposite optical ceramic material.

In this particular example, powder 50 comprises a mixture of $Y_2O_3$ nanograins 52 and MgO nanograins 54, each having a grain dimension which is sub-micron in all directions and less than approximately $\frac{1}{10}^{th}$ the IR transmission wavelength. Specifically, all of the constituent elements have sub-micron grain dimensions, i.e., there is no host (i.e., macro) matrix.

In general, the two or more different phases of nanograins in the powder are selected from materials which are sufficiently transparent in the wavelength range of interest and can be processed to retain nanograins of submicron size in at least one direction. These materials include, but are not limited to oxides, such as $Y_2O_3$, MgO, alumina, (aluminum oxide ($Al_2O_3$), spinel (magnesium aluminum oxide ($MgAl_2O_4$)) and non-oxides, such as carbides (e.g. silicon carbide (SiC)), oxycarbides (e.g. silicon oxycarbide ($SiO_xC_y$)), nitrides (e.g. silicon nitride ($Si_3N_4$)), oxynitrides (e.g. ($SiO_xN_y$)), borides (e.g. zirconium boride ($ZrB_2$)), oxyborides, (e.g. zirconium oxyboride ($ZO_xB_y$), sulfides, (e.g. zinc sulfide (ZnS)), selenides (e.g. zinc selenide (ZnSe)), sulfo-selenides (e.g. $ZnS_xSe_y$)), as well as semiconductors, such as silicon (Si) and germanium (Ge). In one embodiment, a LWIR application is desired, and ZnS is selected as a first phase. In one embodiment, the two phases are $Y_2O_3$ and calcium oxide (CaO).

The different phases of nanograins in a given powder are mutually neutral in that they do not react chemically with each other. In one embodiment, the nanograins are selected to have similar refractive indices. In one embodiment, the difference between refractive indices of nanograins in a given powder is less than about 0.25. If the disparity in refractive indices is too large, inter-particle scattering can occur, which will degrade optical performance.

The material shown in FIGS. 3A and 3B is a nanocomposite optical ceramic material comprising approximately 50:50 by volume of $Y_2O_3$:MgO, although the invention is not so limited. The relative percentages of the constituent nanograins in the powder (the composition of the powder) may be varied to achieve different optical properties, strength and thermal conduction. The relative percentages and types of nanograins may be varied between the spherical and conical portions of the extended dome. The constituent elements and/or relative percentages are varied across the seamless transition between the two different geometries.

Figure 4:
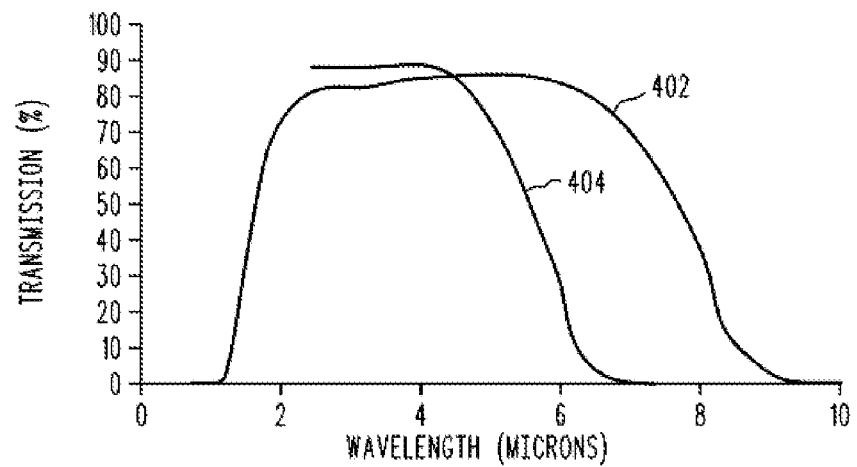
FIG. 4 shows transmission versus wavelength of an approximately 50:50 mixture (by vol.) of yttria:magnesia ($Y_2O_3$:MgO) nanocomposite optical ceramic material as compared to sapphire in accordance with an illustrative embodiment of the present invention.

Rayleigh scattering affects the ability of certain nanocomposite optical ceramic materials to function in the lower spectral regions, such as SWIR and visible regions. Rayleigh scattering can be reduced by decreasing particle size and improving refractive index match between phases of the nanocomposite, such as by adding a dopant. FIG. 4 shows transmission versus wavelength for the material of FIG. 3 in the midwave IR range (curve 402), as compared with sapphire (curve 404). As can be seen, the nanocomposite optical ceramic material performs better than sapphire in the MWIR, but Rayleigh scattering causes a short wave cut-on (SWCO) at about one to two microns. As such these nanocomposite optical ceramic materials are not transparent at 1.5 micrometers, at 1.06 micrometers or in the visible region.

Figure 5:
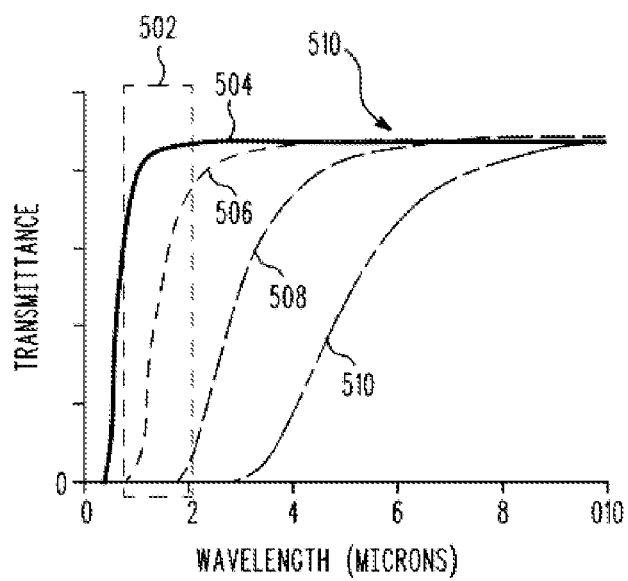
FIG. 5 shows transmission versus wavelength of various alternative solid solution-based nanocomposite optical ceramic materials in accordance with illustrative embodiments of the present invention.

In contrast, when the refractive index difference (Δn) is reduced, i.e., refractive index mismatch improved, Rayleigh scattering is minimized and the SWCO is shifted to shorter wavelengths. In the embodiments shown in FIG. 5, various alternative solid solution-based nanocomposite optical ceramic materials with various useful levels of transparency within a solid solution-based target range 502 of about 0.4 to about two (2) microns are shown. As such, the solid solution-based target range 502 includes the visible range of about 0.4 to about 0.75 μm and a portion of the SWIR, although the invention is not so limited. In other embodiments, the solid solution-based target range 502 can include higher SWIR wavelengths, as well as some or all of the MWIR spectrum or higher. The solid solution-based target range 502 is obtainable when delta n (Δn) is about 0.01 as shown with curve 504. The solid solution-based target range 502 is also obtainable even with a Δn of 0.05 as shown in curve 506, although the SWCO is shifted to the right as compared with curve 504. Once the Δn approaches 0.2 as shown in curve 508, the SWCO shifts further to the right. A Δn of 0.6, shifts the SWCO even further to the right as shown in curve 510.

In one embodiment, the novel solid-solution based nanocomposite optical ceramic materials are more sensitive to the percentage difference in refractive index rather than the actual average index of the entire nanocomposite. In the modeling shown in Example 1, for example, with $Y_2O_3$ and MgO, an average refractive index for the two phases of 1.75 was used. If silicon or germanium materials are used, an acceptable average refractive index may be 3 or 4. For other materials which do not absorb in the visible spectrum, an acceptable average refractive index may be less than two (2).

Figure 6:
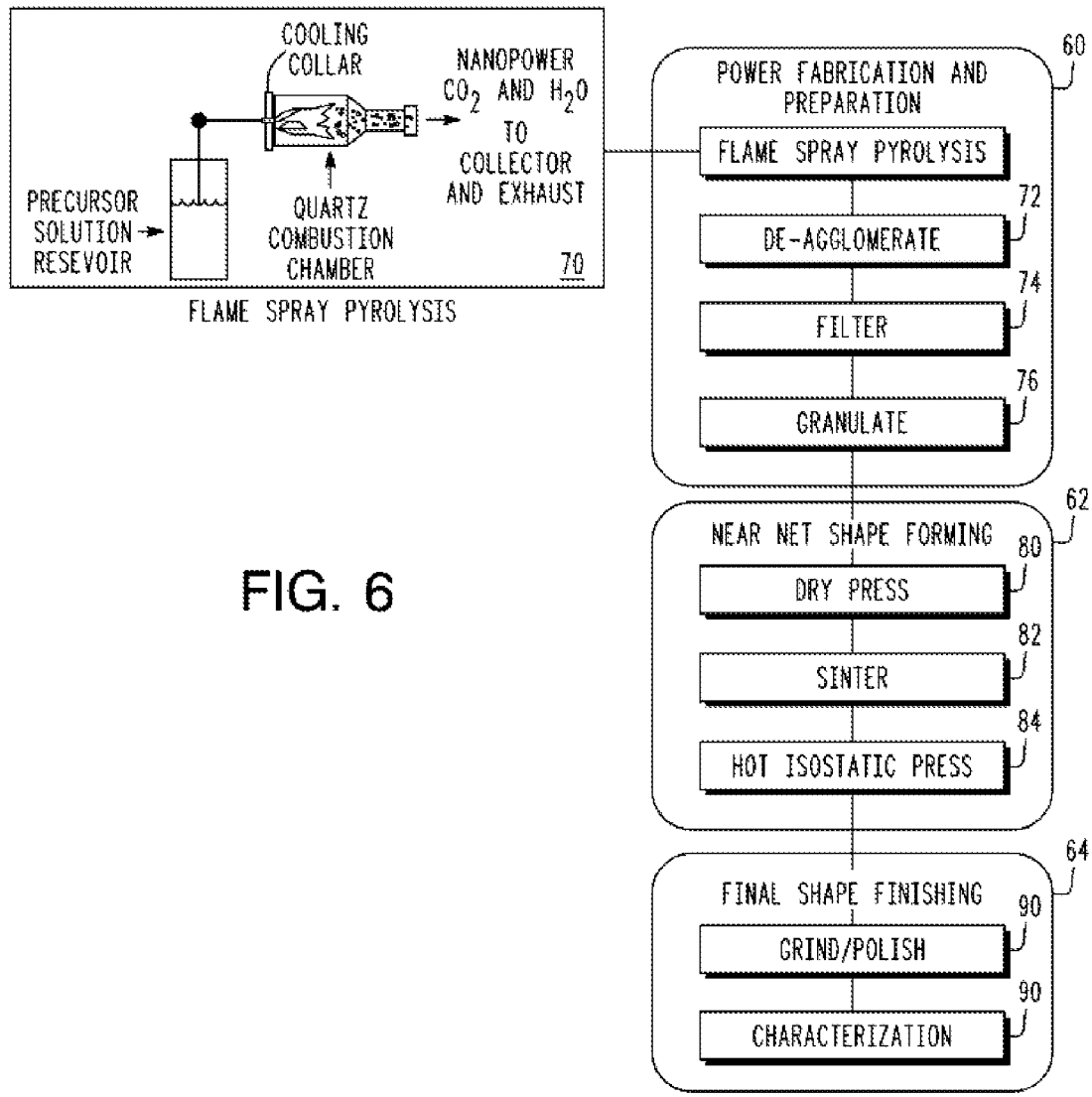
FIG. 6 is a flow diagram for manufacture of a one-piece extended dome from a nanocomposite optical ceramic material in accordance with an illustrative embodiment of the present invention.

Referring now to FIG. 6, an embodiment for integrally forming a one-piece extended dome from a nanocomposite optical ceramic powder comprises the steps of powder fabrication and preparation (step 60), near net shape forming (step 62) and final shape finishing (step 64). Fabrication and preparation may use a Flame Spray Pyrolysis (FSP) to provide a precursor solution of nano-sized MgO and $Y_2O_3$ (step 70). Other techniques may also be employed to provide the precursor solution, which is de-agglomerated (step 72) e.g., ground and mixed with a mill, to break up any clumps. The solution is then filtered (step 74) to remove impurities and any residual large particles from the solution. The solution is granulated (step 76) to remove the liquid solution to form a dry powder. Near net shape forming may be accomplished using a dry press process (step 80) in which the powder is packed into a mold of the desired extended dome and pressure is applied to produce a green body of the desired near net shape. A sintering process (step 82) applies heat to densify the green body. A hot isostatic press (step 84) applies heat and pressure to complete densification and eliminate any remaining voids to make a fully dense dome blank. Final shape finishing includes precision grinding and polishing (step 90) the surface of the dome to the finished shape and characterization (step 92) of the dome's mechanical and optical properties to verify the dome meets the specifications.

Figure 7:
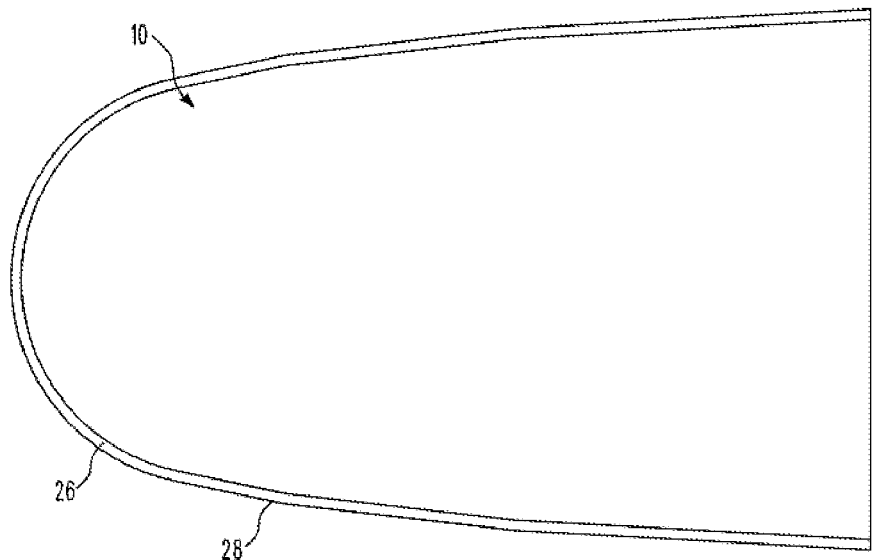
FIG. 7 is a section view of a one-piece extended dome comprising a seamless transition between the non-complementary spherical and conical geometries in accordance with an illustrative embodiment of the present invention.

Referring now to FIG. 7, the transition from the spherical shape 26 to the conical shape 28 of the extended dome 10 is seamless, with no attachment points or optical interfaces. The one-piece extended dome comprises seamless first and second non-complementary geometric shapes. ("Non-complementary" refers to sections of different geometries e.g. spherical and conical or spherical and ogive). Other non-complementary pairings may also be possible. The typical shape will include a spherical leading shape and either a conical or ogive trailing shape to flare the dome to meet the diameter of the platform.

Figure 8A:
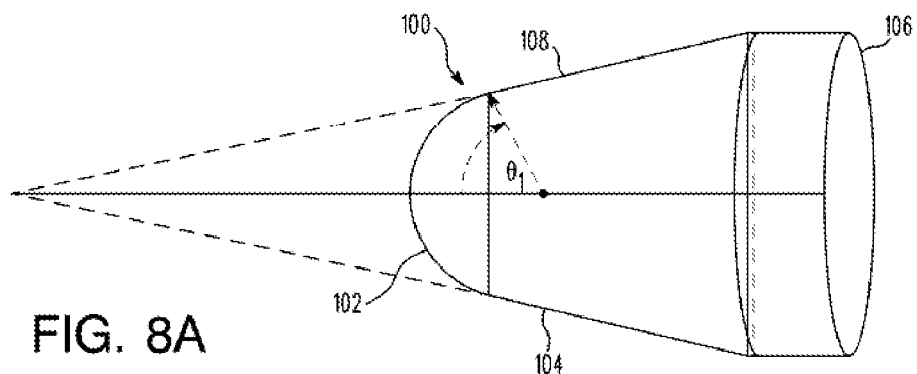
FIGS. 8A-8C are section views of different sphero-conical geometries in accordance with an illustrative embodiment of the present invention.
Figure 8B:
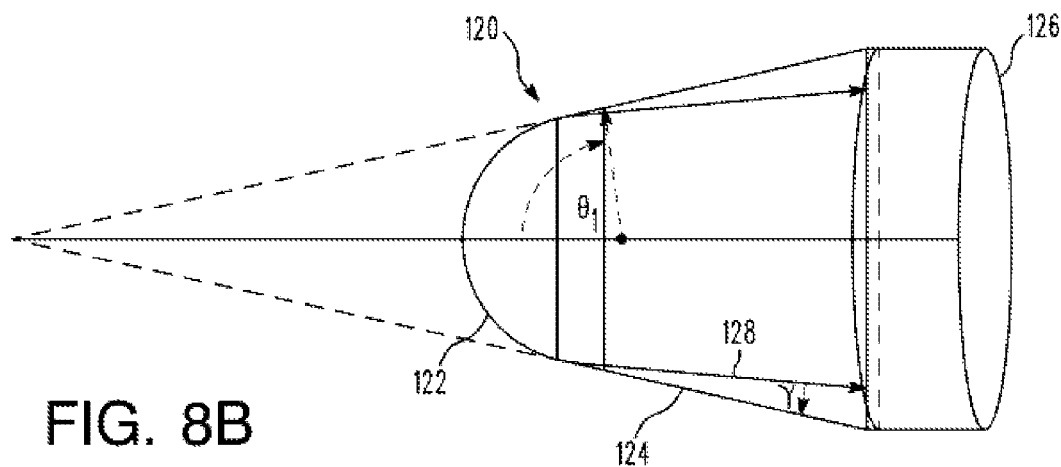
Figure 8C:
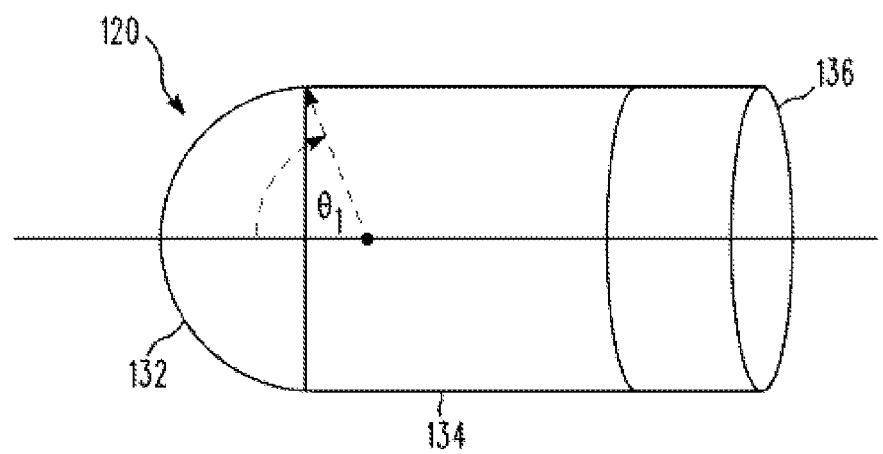

FIGS. 8A through 8C illustrate different embodiments of a sphero-conical dome. Referring now to FIG. 8A, a one-piece extended dome 100 integrally formed of a nanocomposite optical ceramic material comprises a leading spherical shape 102 and a trailing conical shape 104 that flares the diameter of the dome from the diameter of the spherical shape to the diameter of the platform 106. The conical geometric shape has inner and outer surfaces tangent to inner and outer surfaces respectively of the spherical shape at the point of seamless transition. In other words, lines 108 tangent to the surfaces of the spherical shape at the transition are coincident with the conical shape. In this case, the look angle Θ1 of spherical shape 102 is selected to satisfy this constraint. That angle will depend upon the platform diameter and any overall length limitation on the dome itself. This approach ensures a smooth physical transition between the spherical and conical shapes but may not maximize the look angle of the spherical shape, which is generally desirable.

Referring now to FIG. 8B, a one-piece extended dome 120 integrally formed of a nanocomposite optical ceramic material comprises a leading spherical shape 122 and a trailing conical shape 124 that flares the diameter of the dome from the diameter of the spherical shape to the diameter of the platform 126. The conical shape has inner and outer surfaces that form a non-zero positive angle γ to surfaces 128 tangent to inner and outer surfaces respectively of the spherical shape at the point of seamless transition. In other words, the conical shape forms a skirt that flares outwards at a larger angle to transition from the diameter of the spherical shape to the platform diameter. In this case, the look angle $Θ_1$ of spherical shape 122 is suitably selected to be as close to 90° as practicable. This maximizes the look angle of the spherical shape.

Referring now to FIG. 8C, a one-piece extended dome 130 integrally formed of a nanocomposite optical ceramic material comprises a leading spherical shape 132 and a trailing conical shape 134 that extends the dome to platform 136. This is a special case in which the diameter of the spherical section equals the diameter of the platform. In this special case the apex of the conical shape is at infinity whereby the conical shape becomes a cylinder. The surfaces of the cone lie at a non-zero negative angle with respect to the tangent surfaces of the spherical shape unless the spherical shape is 90 degrees in which case they are tangent.

Figure 9:
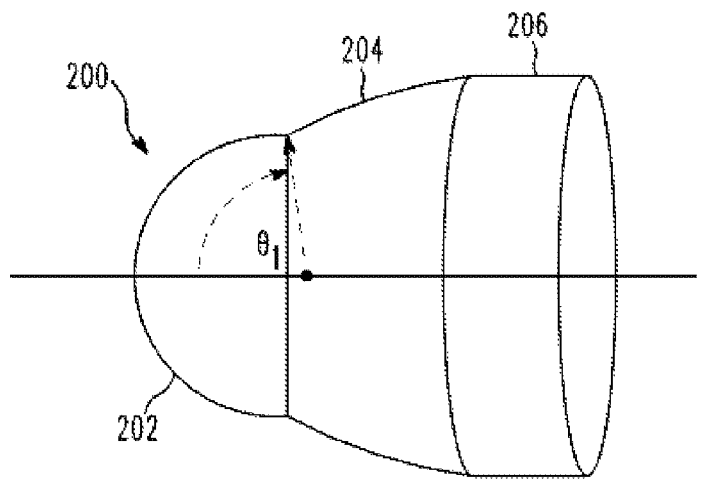
FIG. 9 is a section view of a sphero-ogive geometry in accordance with an illustrative embodiment of the present invention.

Referring now to FIG. 9, a one-piece extended dome 200 integrally formed of a nanocomposite optical ceramic material comprises a leading spherical shape 202 and a trailing ogive shape 204 that flares the diameter of the dome from the diameter of the spherical shape to the diameter of the platform 206. In the extremes as the radius gets larger the arc flattens approaching a cone and as the radius gets smaller the arc gets more pronounced approaching a hemisphere.

With respect to nanocomposite optical ceramic materials (primarily MWIR), and solid solution-based nanocomposite optical ceramic materials in particular (primarily visible and SWIR), several of the various embodiments described herein possess properties which are significantly improved as compared to conventional sapphire. For example, some embodiments are transparent to 8.5 micrometers, as compared to sapphire, which cuts off at six (6) μm. Some embodiments possess an approximately 15-30× lower emissivity than sapphire at five (5) μm and an approximately four (4) times lower emissivity of sapphire at six (6) μm.

It is expected that the various materials will also be harder than sapphire. Additionally, the biaxial strength of the various materials described herein is expected to be higher than sapphire. Similarly, the thermal shock resistance is also expected to improve, as is sand and rain erosion resistance as compared with sapphire The materials may be deliverable in a number of different configurations, such as disks, hemispherical and ogive domes of various sizes (e.g., a few cm in diameter up to several cm in diameter, e.g., between about five (5) and nine (9) cm, such as about 7.64 cm), although the invention is not so limited. The novel materials described herein are also expected to be useful in even larger configurations, including configurations not yet employed for use in a variety of applications, such as various types and sizes of domes, lenses, flats and windows. Such improvements in properties enable the novel material described herein to be useful in missions which not only experience harsher environmental conditions, but in missions which are faster (e.g., Mach 6 or higher), longer and hotter than conditions currently achievable with conventional materials.

Embodiments of the invention will be further described by reference to the following examples, which are offered to further illustrate various embodiments of the present invention. It should be understood, however, that many variations and modifications may be made while remaining within the scope of the present invention.

EXAMPLE 1

The ability of a nanocomposite optical ceramic material to be doped with another material to form a solid solution-based nanocomposite optical ceramic material having a reduced refractive index difference was explored. In this testing, the doping of MgO with a material to cause its refractive index to substantially match that of $Y_2O_3$ was examined with computer modeling. Complications unique to transition metals with localized d shell electrons were also considered.

MedeA software (Materials Design, Inc.) was used to determine index differences between the selected end member pairs for multimode nanocomposites, i.e., components for each phase. Specifically, the MedA software platform was used for calculating the refractive index of the (substantially) pure reference compounds MgO and $Y_2O_3$ at a wavelength of one (1) micron. As such it was determined that the refractive index (RI) of MgO is about 1.649 and the RI of $Y_2O_3$ is about 1.847.

From resources such as the Table 2 from Gladstone and Dale list (Table 2), it is possible to calculate the specific refractive energy of the chief constituents of a material to determine if it will likely going to increase or decrease the RI of another material. As such, the choice was either to select an oxide capable of increasing the RI of MgO or decreasing the RI of $Y_2O_3$. Specifically, it was determined that with a specific refractive energy of NiO, for example, of 0.184, such a material would, itself, have an RI of about 2.227, and so would likely increase the RI of a material such as MgO. Thereafter, phase diagrams of various materials were reviewed to provide a rough approximation as to whether the "right" phase relationships would hold. That is, to be sure that each material can remain in its own phase, even when intermixed in another material. Thereafter, the MedeA software was used to generate a model to determine doping needs of MgO to match NiMgOss index to $Y_2O_3$.

Figure 10:
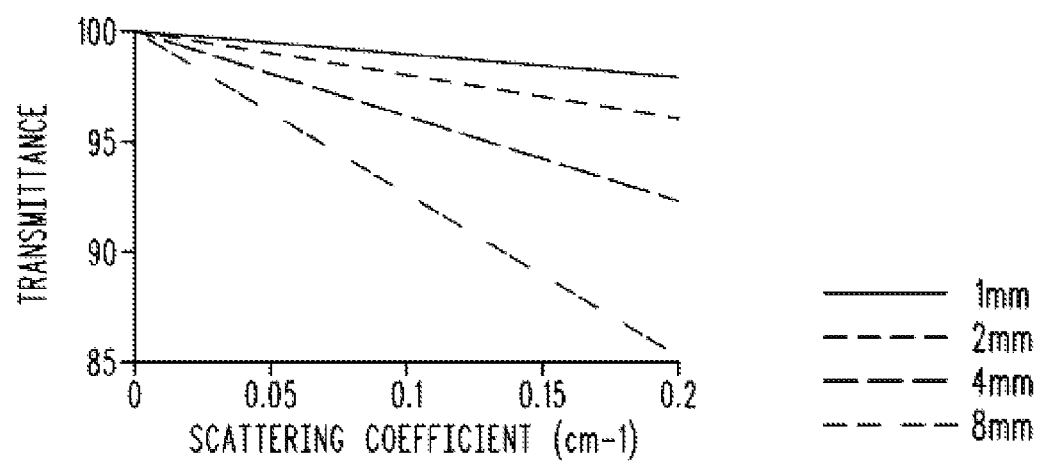
FIG. 10 shows model transmittance of optical materials of varying thicknesses which contain scattering phases with scattering coefficient, γ.

FIG. 10 shows model transmittance of optical materials of varying thicknesses which contain scattering phases with scattering coefficient, γ. For optical materials which are about one (1) to about eight (8) mm in thickness, γ=0.1 cm$^{-1}$ gives a transmittance of greater than 90%. From this information, design constraints which define tolerances were developed.

Modeling was performed using the Rayleigh model with some modifications according to the following equation for the scattering coefficient:

$$\gamma = \frac{32}{9} \frac{\pi^4 a^3}{\lambda_0^4} (n_A^2 - n_B^2)^2 f_A (1 - f_A)^2$$

$n_A$ and $n_B$ are the RIs for two different phases, A and B, present in the nanocomposite as nanograins, a is the average radius of the nanograins, $f_A$ is the volume fraction of the A phase, and $\lambda_0$ is the wavelength of the mode of operation. For purposes of this experiment, it was assumed that the scattering was occurring as independent, single scattering, although it is understood this may not be the case over the entire range. (Additional modeling may take other factors into account, such as dependent or correlated and multiple scattering effects.)

Figure 11A:
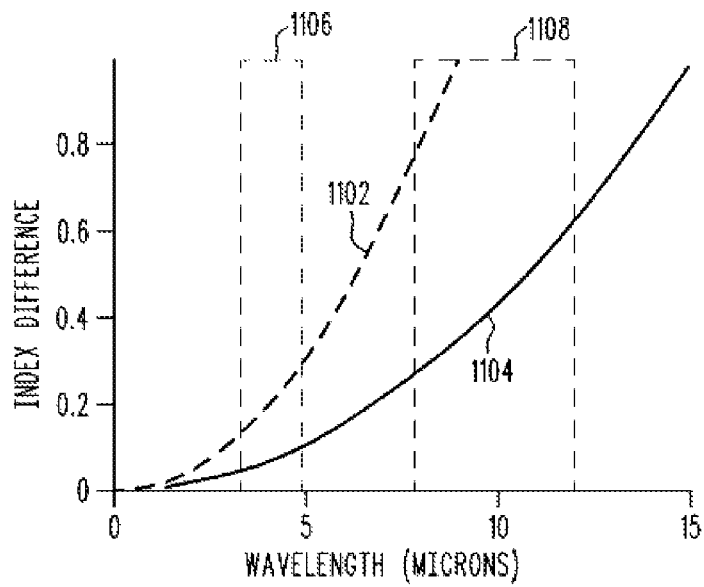
FIG. 11A shows the modeling results of index difference versus wavelength in a spectrum which includes MWIR and LWIR wavelengths.
Figure 11B:
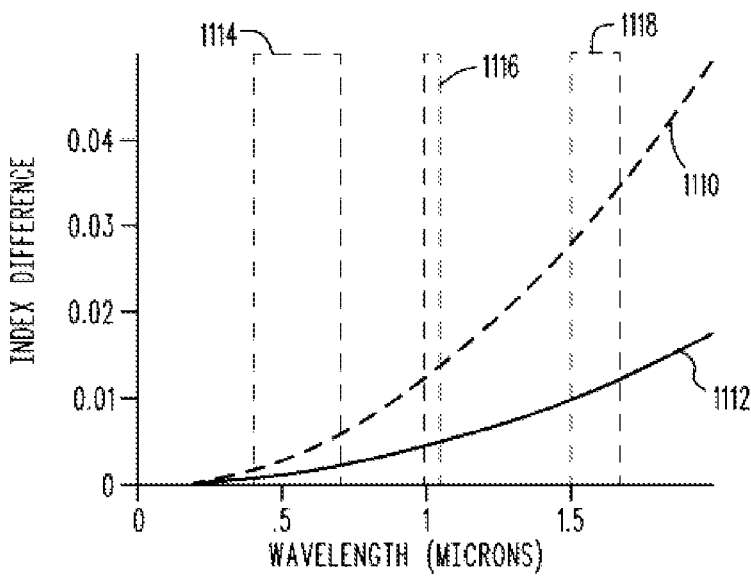
FIG. 11B shows the modeling results of index difference versus wavelength (at $\gamma=0.1$ cm$^{-1}$) in a spectrum which includes the visible, SWIR and eye safe wavelengths.

FIGS. 11A and 11B show the absolute magnitude of the index difference. Specifically, at $(\gamma)=0.1$ cm$^{-1}$, FIG. 11A shows the modeling results of index difference versus wavelength for nanostructures (curve 1102) compared to conventional larger structures (200 nm) (curve 1104) in a spectrum which includes a portion of the MWIR (area 1106) and a portion of the LWIR (area 1108). As can be seen, the smaller the structure, the larger the difference in index that allows the next lower wavelength mode to be picked up. FIG. 11B shows the modeling results of index difference versus wavelength (at $\gamma=0.1$ cm$^{-1}$) for nanostructures (curve 1110) compared to conventional larger structures (200 nm) (curve 1112) in a spectrum which includes the visible (area 1114), a portion of the SWIR (curve 1116) and a portion of the eye-safe spectrum (area 1118). For FIGS. 11A and 11B, the volume fraction of the second phase ($f_A$), i.e., the non-doped phase, is assumed to be 0.5, with $n_{ave}$ equal to 1.75).

With this information, it is possible to provide tolerances around the dopant amount which represent a substantially perfect match. See Table 1:

TABLE 1

Likely Ranges for Maximum Δn Tolerable for various wavelengths (for nanograin sizes ranging from 100 to 200 nm)

| | Wavelength | | | | |
|---|---|---|---|---|---|
| | Visible | SWIR | Eye Safe | MWIR | LWIR |
| Δn range | 0.001-0.003 | >0.003 up to 0.012, such as .004-0.012 | 0.01-0.03 | >0.03 up to 0.2, such as 0.07-0.2 | >0.2, such as >0.43 up to 2 |
| % difference | 0.05-0.15 | >0.15 up to 0.6, such as 0.2-0.6 | 0.5-1.5 | >1.5 up to 10, such as 3.5-10 | >10, such as >21.5 up to 115% |

As Table 1 shows, Δn is closely related to wavelength. Essentially, Table 1 shows the acceptable tolerances for a solid solution-based nanocomposite optical ceramic material capable of transmitting in the visible range up through LWIR. The various ranges for Δn are estimates. Additionally, the index differences shown are not intended to represent a range which must be met, rather the Δn need to be equal to or less than some value that lies in this range. As such, it is likely that index differences on the order of magnitude shown and lower will work in the range indicated. A smaller index difference will allow additional mode(s) to be picked up.

For example, with SWIR, the maximum value of the difference in index that the two phases (for nanograins ranging in size from 100 to 200 nm) can have and still transmit in the SWIR spectrum lies somewhere in the range of about 0.003 to about 0.012. As can be seen in FIG. 11B, if the grain size is smaller, the "dashed" line shifts to higher values and a larger difference in index can be tolerated and still pass the region 1116.

If too little dopant is added, the requisite Δn cannot be achieved. For example, in embodiments in which a Δn of zero is desired, sufficient dopant needs to be added to first achieve Δn=0. If an additional phase forms prior to reaching Δn=0, further additions will only increase the amount of the additional phase, and not the refractive index of the solid solution phase. With this testing, if too little dopant is added to the MgO the index of the solid state phase will be too low as compared with $Y_2O_3$. If too much is added the index of the solid state phase will be too high, such as higher than $Y_2O_3$. In either case, scattering results and SWCO is shifted to longer wavelengths. Deviation from a perfect match in refractive indices in either direction will cause transparency to be lost. In this example, with NiO added to MgO, as the perfect composition is approached (from below) by adding NiO, the SWCO shifts to lower and lower wavelengths. At the perfect matching composition (Δn=0), there is no scatter and the material is transparent at all wavelengths where there is no absorption. If additional NiO is added, the index for the solid solution phase will begin to depart from the perfect matching value, eventually becoming larger than $Y_2O_3$ and scattering will again occur. Adding even more NiO at this point will only cause the SWCO to shift to longer wavelengths and additional modes will be lost.

With respect to the visible range, Table 1 indicates that sufficient dopant needs to be added to modify a first phase of a nanocomposite optical ceramic material to provide a maximum index difference between the first phase and a second phase that lies in the range between about 0.001 and about 0.003 and still achieve transparency as modeled (at $(\gamma)=0.1$ cm$^{-1}$). In other words, in order for the material to function in the visible range with sufficient transparency, there can be a maximum difference in refractive index between the two phases lying in the range between about 0.05% and about 0.15%.

With respect to the SWIR range, as noted above, Table 1 indicates that sufficient dopant needs to be added to modify a first phase of a nanocomposite optical ceramic material to provide maximum index difference between the first phase and a second phase that lines in the range between about 0.003 up to about 0.12, such as between about 0.004 and about 0.012 and still achieve transparency as modeled (at $(\gamma)=0.1$ cm$^{-1}$). In other words, in order for the material to function in the SWIR range with sufficient transparency, there can be a maximum difference in refractive index between the two phases lying in the range between about 0.15% and about 0.6%.

With respect to the eye safe range, Table 1 indicates that sufficient dopant needs to be added to modify a first phase of a nanocomposite optical ceramic material to provide a maximum index difference between the first phase and a second phase that lies in the range between about 0.01 and about 0.03 and still achieve transparency as modeled (at $(\gamma)=0.1$ cm$^{-1}$). In other words, in order for the material to function in the eye safe range with sufficient transparency, there can be a maximum difference between the two phases lying in the range between about 0.5% and about 1.5%.

With respect to the MWIR range, Table 1 indicates that sufficient dopant needs to be added to modify a first phase of a nanocomposite optical ceramic material to provide maximum index difference between the first phase and a second phase that lies in the range between about 0.03 and about 0.2, such as between about 0.07 and about 0.2, and still achieve transparency as modeled (at $(\gamma)=0.1$ cm$^{-1}$). In other words, in order for the material to function in the MWIR range with sufficient transparency, there can be a maximum difference between the two phases lying in the range between about 0.5% and about 1.5%, such as lying in the range between about 3.5% and about 10%.

With respect to the LWIR range, Table 1 indicates that sufficient dopant needs to be added to modify a first phase of a nanocomposite optical ceramic material to provide maximum index difference between the first phase and a second phase that lies above about 0.2, such as in the range between about 0.43 and about 2, and still achieve transparency as modeled (at $(\gamma)=0.1$ cm$^{-1}$). In other words, in order for the material to function in the LWIR range with sufficient transparency, there can be a maximum difference between the two phases of greater than about 10% such as lying in the range between about 21.5% and 115%.

Figure 12:
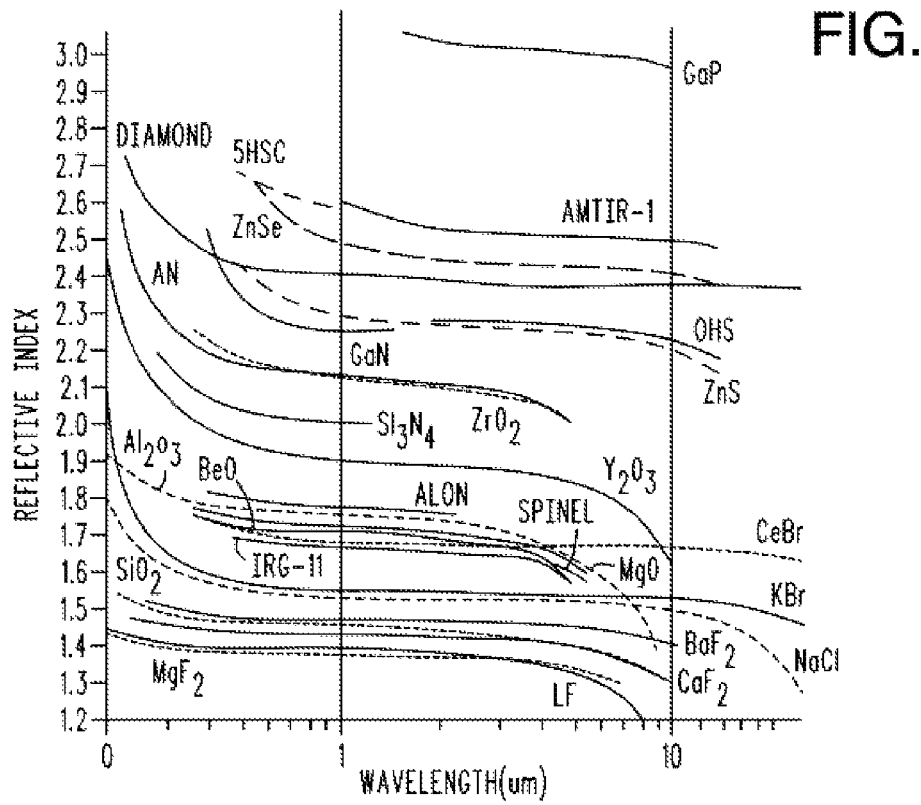
FIG. 12 provides refractive index data for common materials.

The literature was reviewed in an effort to identify suitable nanocomposite end-member pairs based on Δn. The information available, however, such as the index dispersion of common dome and window materials from "Materials for Infrared Windows and Domes: Properties and Performance", Daniel C. Harris, SPIE Optical Engineering Press, p. 17, (1999) and shown in FIG. 12 only provides refractive index data for common materials So-called "uncommon" materials are shown in Table 2 (from Gladstone and Dale (1864)). However, these materials are only known by additive combination of constants accurate to 5% at best and at a single wavelength.

TABLE 2

Specific refractive energies $\left(\frac{n-1}{d} = k\right)$ of the chief constituents of minerals.

| | Molecular weight. | k. |
|---|---|---|
| H$_2$O | 18 | [a].3351, [b].340, [c].354 |
| Li$_2$O | 30 | .31 |
| (NH$_4$)$_2$O | 52 | .503 |
| Na$_2$O | 62 | .181 |
| K$_2$O | 94 | .189 |
| Cu$_3$O | 143 | .250 |
| Rb$_2$O | 187 | .129 |
| Ag$_3$O | 232 | .154 |
| Cs$_2$O | 282 | .124 |
| Hg$_2$O | 416 | .169$_{Li}$ |
| Tl$_2$O | 424 | .120 |
| GlO | 25 | .238 |
| MgO | 40.4 | .200 |
| CaO | 56 | .225 |
| MnO | 71 | [d].191, [e].224 |
| FeO | 72 | .187 |
| NiO | 75 | .184 |
| CoO | 75 | .184 |
| CuO | 79.6 | [d].191, [e].253$_{Li}$ |
| ZnO | 81.4 | [d].153, [e].183 |
| SrO | 103.6 | .143 |
| CdO | 128.4 | .134 |
| BaO | 153.4 | .127 |
| HgO | 216 | .18 |
| PbO | 223 | [d].137, [e].175$_{Li}$ |
| B$_2$O$_3$ | 70 | [g].220 |
| C$_2$O$_3$ | 72 | .265 |
| Al$_2$O$_3$ | 102 | .193, [f].214 |
| Cr$_2$O$_3$ | 152 | .27 |
| Mn$_2$O$_3$ | 158 | [d].300, [e].304$_{Li}$ |
| Fe$_2$O$_3$ | 160 | [d].308, [e].36$_{Li}$ |
| As$_2$O$_3$ | 198 | [g]0.202, [h]0.225 |
| Yt$_2$O$_3$ | 226 | .144 |
| Sb$_2$O$_3$ | 228.4 | [g].209, [i].232 |
| La$_2$O$_3$ | 326 | .149 |
| Ce$_2$O$_3$ | 328.5 | .16 |
| Bi$_2$O$_3$ | 464 | .163 |
| CO$_3$ | 44 | .217 |
| SiO$_3$ | 60 | .207 |

TABLE 2-continued

Specific refractive energies $\left(\frac{n-1}{d} = k\right)$ of the chief constituents of minerals.

| | Molecular weight. | k. |
|---|---|---|
| TiO$_3$ | 80 | .397 |
| SeO$_3$ | 111 | .147 |
| ZrO$_3$ | 122.5 | .201 |
| SnO$_3$ | 151 | .145 |
| SbO$_3$ | 152 | .198 |
| TeO$_3$ | 159.5 | [e].200$_{Li}$ |
| ThO$_3$ | 264.5 | .12 |
| N$_2$O$_3$ | 108 | .240 |
| P$_2$O$_3$ | 142 | .190 |
| Cl$_2$O$_3$ | 151 | .218 |
| V$_2$O$_3$ | 182.4 | .43 |
| As$_2$O$_3$ | 230 | .169 |
| Br$_2$O$_3$ | 240 | .183 |
| Cb$_2$O$_3$ | 268 | .295 |
| Sb$_2$O$_3$ | 320.4 | .152, .222(?) |
| I$_2$O$_3$ | 334 | .177 |
| Ts$_2$O$_3$ | 446 | .133 |
| SO$_3$ | 80 | .177 |
| CrO$_3$ | 100 | .36 |
| SeO$_3$ | 127 | .165 |
| MoO$_3$ | 144 | .241$_{Li}$ |
| TeO$_3$ | 175.6 | .607 |
| WO$_3$ | 235 | .133 |
| UO$_3$ | 286.5 | .134 |

[a]Water and ice.
[b]Average.
[c]Alums, etc.
[d]Calculated from compounds containing the oxide.
[e]Calculated from the oxide.
[f]Calculated from feldspar, feldspathoids, etc.
[g]Isometric oxide.
[h]Monoclinic oxide.
[i]Orthorhombic oxide.

As such, the inventor is the first to provide a solid solution-based nanocomposite optical ceramic material comprising components which allow only the doped phase to be impacted by a dopant, but not the other phase or phases, as confirmed with computer modeling.

As will be shown herein, surprisingly, the two phase nanocomposite material of MgO and Y$_2$O$_3$ discussed above, in combination with a specific amount of NiO as the dopant in MgO, exhibits transmittance not only in the SWIR, but also in the visible spectrum (while retaining excellent mechanical properties), by reducing the difference in the refractive index between MgO and Y$_2$O$_3$, thereby minimizing Rayleigh scatter. It is expected that other combinations of nanostructures may be combined to convert a nanocomposite optical ceramic material into a solid solution-based nanocomposite optical ceramic material having the desired properties for a particular application or applications.

Figure 13:
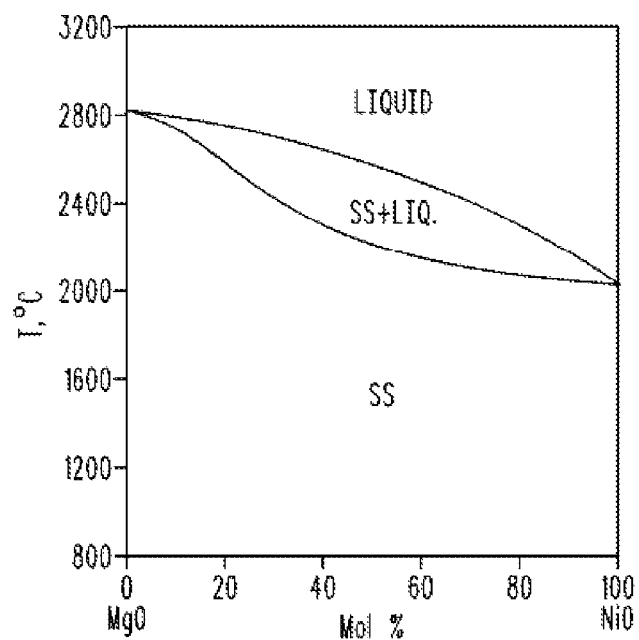
FIG. 13 shows a binary phase diagram for NiO and MgO.

As discussed herein, NiO and MgO are mutually soluble in each other in the solid solution-based. See FIG. 13, for example which shows a binary phase diagram for NiO and MgO. The constraints as shown in Table 1 apply, such that if too much NiO is added, the two phases would not be preserved, resulting in ternary phases.

Figure 14:
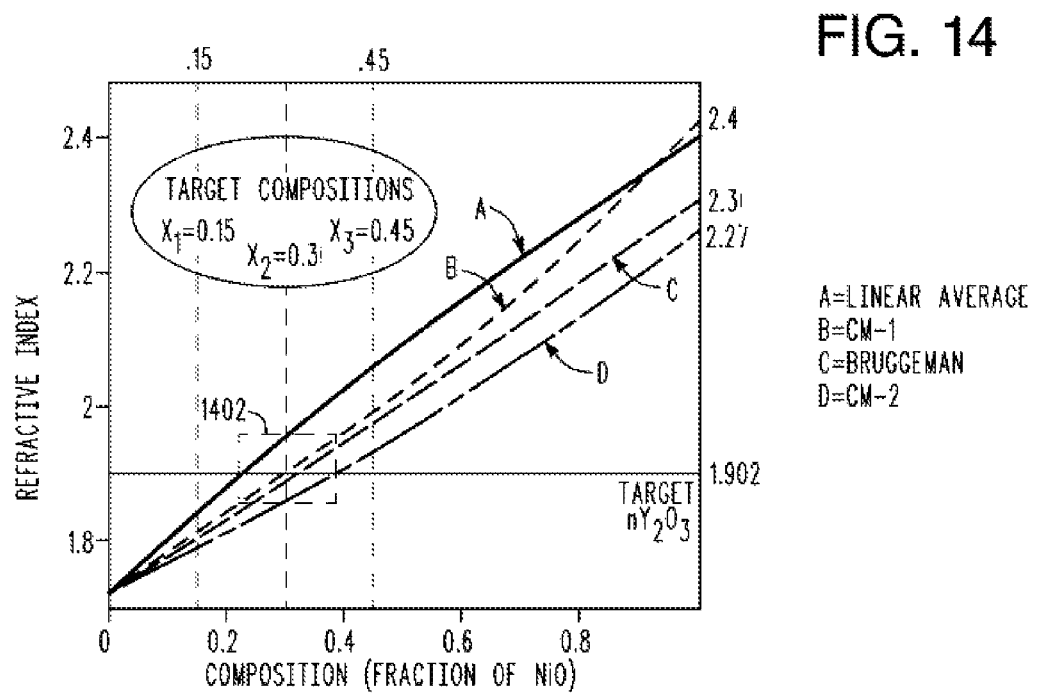
FIG. 14 shows the modeling results of refractive index versus fractional composition of NiO for various solid solution-based MgNiO (NiMgOss) materials in accordance with illustrative embodiments of the present invention.

FIG. 14 shows the modeling results for refractive index versus fractional composition of NiO in solid solution-based MgNiO (NiMgOss) in curves A, B, C and D, with the selected target area 1402 showing the target level 1404 of 1.902 for nY$_2$O$_3$. Target compositions of NiO were initially selected at values of 0.15, 0.3 and 0.45 as shown. The various curves show the linear average refractive index, the Clausious Methodxy Expression, (CM-1 and CM-2) and the Bruggerman effective medium approximation (EMA). As is known in the art, the CM Expression predicts the refractive index as a function of weighted combinations of atomic polarizability of the atoms in the structure. As FIG. 14 shows, it is theoretically possible to use a range of possible polarizabilities for the nickel.

Complications unique to transition metals with localized d shell electrons were also considered. As such, the CME software was further optimized with respect to this property, with use of electron density functional and hybrid functional providing the best results, Ni—Ni ordering and electron spin orientation. A very slight preference for Ni—Ni spacing of 0.42 nm with opposite spins was shown. The algorithm showed that the efficiency of hybrid functional calculations was greatly increased.

Figure 16:
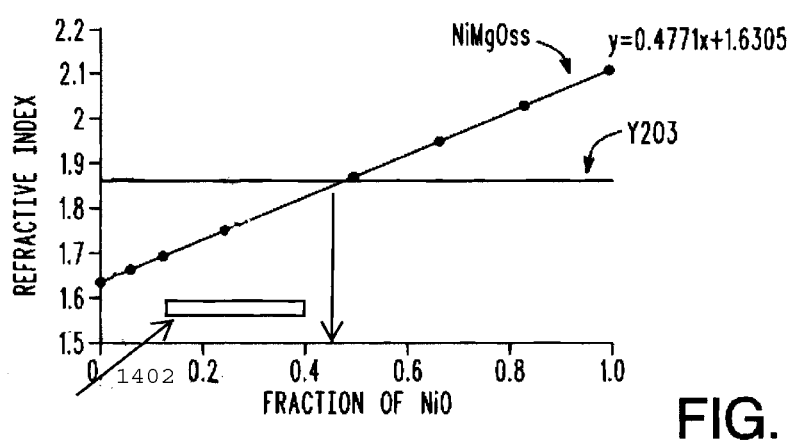
FIG. 16 shows the modeling results of refractive index versus fractional composition of NiO for a solid solution-based MgNiO (NiMgOss) material in accordance with an illustrative embodiment of the present invention.

FIGS. 15A-15I show models of computational cells used in this study, together with their particular space group (or crystallographic group, or Fedorov group), which is a description of the symmetry of the crystal build unit cells of a crystal. The CME software was allowed to "relax" the structure such that a steady state equilibrium configuration was reached. From that, the CME software was able to calculate both the refractive index was calculated and the polarization matrix FIG. 16 shows the modeling results for the refractive index versus fractional composition of NiO for a solid solution-based MgNiO (NiMgOss) material with the original "selected target area" 1402 identified. Surprisingly, the composition predicted to substantially match the refractive index of $Y_2O_3$ has a much higher NiO content than the prior art would suggest. The $Ni_{0.455}Mg_{0.545}O$ composition is also higher than any compositions in the selected target area 1402. However, the computer modeling confirms that a solid solution nanocomposite material having a doped nano-sized solid solution-based phase of $Ni_{0.455}Mg_{0.545}O$ and a non-doped nano-sized phase of $Y_2O_3$ will minimize Rayleigh Scatter and be capable of transmitting infrared light in the visible spectrum.

One can determine an amount sufficient to reduce a refractive index difference among the plurality of nano-sized phases to about 0.2 or less when infrared light is being transmitted, as follows. For instance, FIG. 16 shows a plot of refractive index for a material mixture. The material mixture includes a base material, and a dopant dissolved in a base material. The refractive index is plotted as a function of the fractional concentration of the dopant. The plotted curve is linear. The leftmost edge of the curve, where the concentration of dopant is 0%, shows a refractive index value equal to that of the base material (1.6305). The rightmost edge of the curve, where the concentration of dopant is 100%, shows a refractive index value equal to that of the dopant (0.4771+1.6304, or 2.1076). FIG. 16 provides a linear formula to determine the refractive index of the material mixture for dopant concentrations between 0% and 100%:

$$y=0.4771x+1.6305,$$

where y is the refractive index of the material mixture, x is a fractional concentration of the dopant between 0.0 and 1.0, 1.6305 is a refractive index of the base material, and 0.4771 is a difference between a refractive index of the dopant (2.1076) and the refractive index of the base material (1.6305).

It is algebraically straightforward to invert this relationship to solve for the dopant concentration x:

$$x=(y-1.6305)/(0.4771)$$

One can write this relationship as:

$$x=(y-B)/(D-B),$$

where x is the fractional concentration of dopant, y is the refractive index of the material mixture of dopant dissolved in base material, B is the refractive index of the base material, and D is the refractive index of the dopant. To ensure a refractive index difference of about 0.2 or less, so that the value of (F−0.2) and (F+0.2) may be substituted for y in the above equation, where F is the refractive index of a first nano-sized phase.

In order to achieve a refractive index of the second nano-sized phase having a value between $$(F-0.2) \quad (1)$$

and $$(F+0.2), \quad (2)$$

the fractional concentration of dopant should be between $$(F-0.2-B)/(D-B) \quad (3)$$

and $$(F+0.2-B)/(D-B), \quad (4)$$

where F is the refractive index of the first nano-sized phase, B is the refractive index of the base material, D is the refractive index of the dopant, and 0.2 is the maximum refractive index difference between the first and second nano-sized phases.

Equations (1) through (4) provide a relationship between dopant concentration and refractive index difference between first and second nano-sized phases. Equations (1) through (4) are easily derived from the plot in FIG. 16, and are found without requiring undue experimentation from one of ordinary skill in the art. Such a relationship can determine the amount sufficient to reduce a refractive index difference among the plurality of nano-sized phases to about 0.2 or less when infrared light is being transmitted.

In some examples, a solid solution-based optical material capable of transmitting light can include a first nano-sized phase, and can include a second nano-sized phase formed from a base material and a dissolved dopant. The base material and the first nano-sized phase can have refractive indices that differ by more than 0.2. The dopant concentration can be selected so that the second nano-sized phase and the first nano-sized phase have refractive indices that differ by a selected amount, such as less than 0.2, less than 0.12, less than 0.07, less than 0.03, less than 0.01, less than 0.003, or less than 0.001.

In some examples, the first nano-sized phase can have a refractive index of F, the base material can have a refractive index of B; and the dopant can have a refractive index of D. The second nano-sized phase can include a concentration of dopant dissolved within the base material. In some examples, the fractional concentration of dopant can be between (F−0.2−B)/(D−B) and (F+0.2−B)/(D−B), so that the second nano-sized phase can have a refractive index between (F−0.2) and (F+0.2). In some examples, the fractional concentration of dopant can be between (F−0.12−B)/(D−B) and (F+0.12−B)/(D−B), so that the second nano-sized phase can have a refractive index between (F−0.12) and (F+0.12). In some examples, the fractional concentration of dopant can be between (F−0.07−B)/(D−B) and (F+0.07−B)/(D−B), so that the second nano-sized phase can have a refractive index between (F−0.07) and (F+0.07). In some examples, the fractional concentration of dopant can be between (F−0.03−B)/(D−B) and (F+0.03−B)/(D−B), so that the second nano-sized phase can have a refractive index between (F−0.03) and (F+0.03). In some examples, the fractional concentration of dopant can be between (F−0.01−B)/(D−B) and (F+0.01−B)/(D−B), so that the second nano-sized phase can have a refractive index between (F−0.01) and (F+0.01). In some examples, the fractional concentration of dopant can be between (F−0.003−B)/(D−B) and (F+0.003−B)/(D−B), so that the second nano-sized phase can have a refractive index between (F−0.003) and (F+0.003). In some examples, the fractional concentration of dopant can be between (F−0.001−B)/(D−B) and (F+0.001−B)/(D−B), so that the second nano-sized phase can have a refractive index between (F−0.001) and (F+0.001).

In some examples, the first nano-sized phase can be $Y_2O_3$, having a refractive index of about 1.847, the base material can be MgO, having a refractive index of about 1.6305, and the dopant can be NiO, having a refractive index of about 2.1076. The second nano-sized phase can includes a concentration of dopant, NiO, dissolved within the base material, MgO. In some examples, the fractional concentration of dopant can be between (1.847−0.03−1.6305)/(2.1076−1.6305), i.e., 39.1%, and (1.847+0.03−1.6305)/(2.1076−1.6305), i.e., 51.6%, so that the second nano-sized phase can have a refractive index between (1.847−0.03), i.e., 1.817, and (1.847+0.03), i.e., 1.877. In some examples, the fractional concentration of dopant can be between (1.847−0.01−1.6305)/(2.1076−1.6305), i.e., 43.3%, and (1.847+0.01−1.6305)/(2.1076−1.6305), i.e., 47.5%, so that the second nano-sized phase can have a refractive index between (1.847−0.01), i.e., 1.837, and (1.847+0.01), i.e., 1.857. In some examples, the fractional concentration of dopant can be between (1.847−0.003−1.6305)/(2.1076−1.6305), i.e., 44.7%, and (1.847+0.003−1.6305)/(2.1076−1.6305), i.e., 46.0%, so that the second nano-sized phase can have a refractive index between (1.847−0.003), i.e., 1.844, and (1.847+0.003), i.e., 1.850. In some examples, the fractional concentration of dopant can be between (1.847−0.001−1.6305)/(2.1076−1.6305), i.e., 45.2%, and (1.847+0.001−1.6305)/(2.1076−1.6305), i.e., 45.6%, so that the second nano-sized phase can have a refractive index between (1.847−0.001), i.e., 1.846, and (1.847+0.001), i.e., 1.848.

Figure 17:
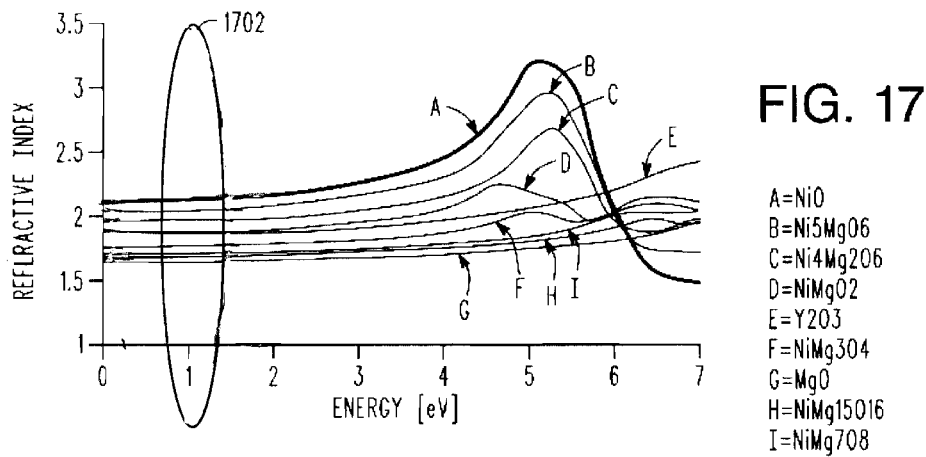
FIG. 17 shows the modeling results of refractive index versus energy (eV) for various solid solution-based nanocomposite optical ceramic materials in accordance with illustrative embodiments of the present invention.

FIG. 17 shows the modeling results for the refractive index versus energy (eV) for various nanocomposite ceramic materials, as modeled by the software, with the area within oval 1702 approximately representing the energy of interest, which corresponds with a spectrum which includes the visible wavelength of 1.06 μm. As can be seen, the refractive index of solid solution-based NiOMgO increases systematically with increasing NiO (See curves A-I).

Figure 18:
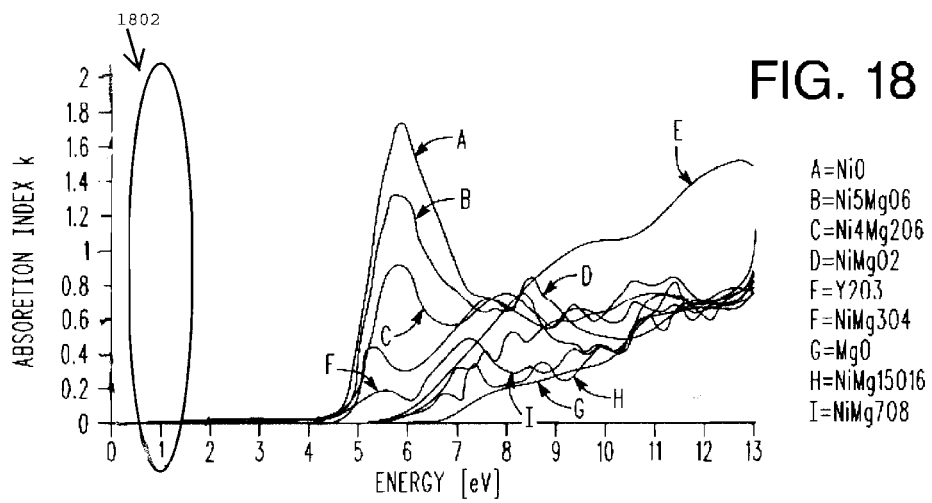
FIG. 18 shows the modeling results of absorption index (k) versus energy (eV) for various ceramic materials in accordance with illustrative embodiments of the present invention.

Additional considerations include whether or not doping of one phase to cause it to become solid introduces absorption or adsorption bands into the undoped phase. FIG. 18 shows the modeling results for absorption index (k) versus energy (eV) for various nanocomposite ceramic materials. As shown, no absorption peaks area present in the area of interest 1702 which corresponds with a spectrum which includes the visible wavelength of 1.06 μm. Additionally, modeled phonon dispersion curves (not shown) further indicated the absence of any absorption bands.

These modeling results demonstrate that combining of NiO and MgO can be combined accomplished, with the resulting solid solution phases having substantially uniform composition. The modeling further showed that a proper phase relationship can exist when solid solution-based NiOMgO is combined with $Y_2O_3$.

EXAMPLE 2

Various dense samples of MgO:$Y_2O_3$, i.e., salt solutions were prepared as described above to verify the modeling work performed with these materials with respect to refractive index. To date, the nanocomposite optical ceramic materials made include: 85:15 mol % MgO:NiO; 70:30 mol % MgO:NiO; and 55:45 mol % MgO:NiO.

Rough approximations of solid solution-based NiMgO:$Y_2O_3$ nanocomposite (two-phase) optical ceramic materials were fabricated by adding large scale (non-nano-sized) NiO. Although these materials were not transparent, this experiment was useful to ensure that the expected chemical interactions exist between these phases (e.g., when heated to above 1200° C.) in order to ensure phase relationships are maintained, e.g., to ensure that a ternary phase is not being produced with the addition of NiO.

EXAMPLE 3

Prophetic

The prototypes fabricated in Example 2, as well as additional prototypes will be optically characterized, including prototypes with varying amounts of $Y_2O_3$ to achieve the desired goal, which, includes transparency. These materials will be compared against the computer modeling results obtained in Example 1. Various mechanical properties, including those noted herein, will also be determined.

CONCLUSION

Embodiments described herein provide a cost-effective extended dome having a spanning angle greater than 180 degrees for EO sensors without the optical interface and discontinuity created along the line of attachment of the first and second non-complementary geometries. The extended dome is an enabling technology that addresses a long felt need in the industry to provide a cost-effective design for a seamless extended dome having a spanning angle greater than 180 degrees. The extended dome may be used, for example, with guided projectiles or DIRCM systems, and the like.

In various embodiments, both phases of these novel optical materials comprise grains with sizes in the submicron range (≤100 nm), which, in effect, eliminates any distinction between a "host" matrix and a "submicron-grained" phase as in the prior art. Instead, use of two or more phases of nanograins allows formation of material barriers to grain growth between the various nanograins, while enhancing both mechanical and optical properties of the nanocomposite optical ceramic material or solid solution-based nanocomposite optical ceramic material. These materials also exhibit an enhancement to their mechanical properties as compared with conventional optical materials comprising less than one phase, while mitigating optical scatter. Additional benefits of this technology include their near-net shape forming capabilities as well as the ability to tailor properties of the composite by varying constituent selection according to a particular application.

With respect to the solid solution-based embodiments, positive benefits of increased strength, hardness and thermal shock resistance that derive from the sub-micron composite structure can be realized, along with extension of the spectral band of applicability beyond the MWIR to the SWIR and visible portions of the spectrum, thus facilitating multi-mode applications.

While several illustrative embodiments of the invention have been shown and described, numerous variations and alternate embodiments will occur to those skilled in the art. For example, although the material has been described herein as a ceramic, any material capable of transmitting optical light can be used, such as a suitable combination of covalent materials, such as diamond, silicon and/or geranium. However, such materials may not be useful in applications requiring wavelengths shorter than MWIR, such as SWIR or visible. However, such variations and alternate embodiments are contemplated, and can be made without departing from the spirit and scope of the invention as defined in the appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A solid solution-based optical material capable of transmitting light, the solid solution-based optical material comprising:
    a first nano-sized phase having a refractive index of F; and
    a second nano-sized phase formed from a base material having a refractive index of B, wherein B differs from F by more than 0.2;
    the second nano-sized phase further including a dopant dissolved within the base material, the dopant having a refractive index of D, the dopant having a fractional concentration between $(F-0.12-B)/(D-B)$ and $(F+0.12-B)/(D-B)$.

2. The solid solution-based optical material of claim 1, wherein the fractional concentration of dopant is between $(F-0.07-B)/(D-B)$ and $(F+0.07-B)/(D-B)$.

3. The solid solution-based optical material of claim 1, wherein the fractional concentration of dopant is between $(F-0.03-B)/(D-B)$ and $(F+0.03-B)/(D-B)$.

4. The solid solution-based optical material of claim 1, wherein the fractional concentration of dopant is between $(F-0.01-B)/(D-B)$ and $(F+0.01-B)/(D-B)$.

5. The solid solution-based optical material of claim 1, wherein the fractional concentration of dopant is between $(F-0.003-B)/(D-B)$ and $(F+0.003-B)/(D-B)$.

6. The solid solution-based optical material of claim 1, wherein the fractional concentration of dopant is between $(F-0.001-B)/(D-B)$ and $(F+0.001-B)/(D-B)$.

7. The solid solution-based optical material of claim 1, wherein:
    the first nano-sized phase is $Y_2O_3$, having a refractive index of about 1.847;
    the base material is MgO, having a refractive index of about 1.6305;
    the dopant is NiO, having a refractive index of about 2.1076; and
    the second nano-sized phase includes a concentration of dopant, NiO, dissolved within the base material, MgO.

8. The solid solution-based optical material of claim 7, wherein the fractional concentration of dopant is between 39.1% and 51.6%.

9. The solid solution-based optical material of claim 7, wherein the fractional concentration of dopant is between 43.3% 47.5%.

10. The solid solution-based optical material of claim 7, wherein the fractional concentration of dopant is between 44.7% 46.0%.

11. The solid solution-based optical material of claim 7, wherein the fractional concentration of dopant is between 45.2% and 45.6%.

\* \* \* \* \*